US012266306B2

(12) United States Patent
Kim et al.

(10) Patent No.: US 12,266,306 B2
(45) Date of Patent: Apr. 1, 2025

(54) DISPLAY DEVICE INCLUDING AN EMISSION DRIVER FOR CONTROLLING AN OFF PERIOD RATIO BASED ON DIMMING SIGNAL

(71) Applicant: SAMSUNG DISPLAY CO., LTD., Yongin-si (KR)

(72) Inventors: Kyung-Woo Kim, Yongin-si (KR); Cheolmin Kim, Yongin-si (KR); Sun-Koo Kang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/364,724

(22) Filed: Aug. 3, 2023

(65) Prior Publication Data

US 2024/0185783 A1 Jun. 6, 2024

(30) Foreign Application Priority Data

Dec. 1, 2022 (KR) ........................ 10-2022-0165602

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0626* (2013.01)

(58) Field of Classification Search
CPC .................................................... G09G 3/3233
USPC ......................................................... 345/691
See application file for complete search history.

(56) References Cited

U.S. PATENT DOCUMENTS

| | | | | |
|---|---|---|---|---|
| 2019/0096331 | A1* | 3/2019 | Kwon | G09G 3/3266 |
| 2019/0114964 | A1* | 4/2019 | Sung | G11C 19/28 |

FOREIGN PATENT DOCUMENTS

| | | |
|---|---|---|
| KR | 10-2002-0006595 | 1/2002 |
| KR | 10-2017-0132401 | 12/2017 |
| KR | 10-2020-0110548 | 9/2020 |

* cited by examiner

*Primary Examiner* — Long D Pham
(74) *Attorney, Agent, or Firm* — F. CHAU & ASSOCIATES, LLC

(57) ABSTRACT

A display device includes a display panel including pixels connected to emission lines, a controller configured to receive a control signal, and to generate an emission start signal, a first emission clock signal and a second emission clock signal, and an emission driver configured to provide emission signals to the pixels through the emission lines in response to the emission start signal, the first emission clock signal and the second emission clock signal. The controller is further configured to determine an off period ratio for the pixels in units of two or more frame periods in response to the dimming signal. The control signal may be a dimming signal, a low power mode signal, or another type of signal indicative of operation of the display device.

20 Claims, 15 Drawing Sheets

DISPLAY DEVICE INCLUDING AN EMISSION DRIVER FOR CONTROLLING AN OFF PERIOD RATIO BASED ON DIMMING SIGNAL

CROSS-REFERENCE TO RELATED APPLICATION(S)

This application claims priority under 35 USC § 119 to Korean Patent Application No. 10-2022-0165602, filed on Dec. 1, 2022, in the Korean Intellectual Property Office (KIPO), the contents of which are herein incorporated by reference in its entirety.

BACKGROUND

1. Field

One or more embodiments described herein relate to a display device, and more particularly to a display device including an emission driver.

2. Description of the Related Art

A variety of display devices have been developed. One type of display device is an active matrix organic light emitting diode (AMOLED) display device. This and other types of display devices include a display panel having a plurality of pixels, a data driver providing data signals to the plurality of pixels, a scan driver providing scan signals to the plurality of pixels, an emission driver providing emission signals to the plurality of pixels, and a controller controlling the data driver, the scan driver and the emission driver.

To adjust a dimming level (or a luminance level) of a display device, a dimming technique may be used. One example dimming technique adjusts a ratio of a non-emission period to a frame period, or an off period ratio (or AMOLED off ratio (AOR)). In this dimming technique, to adjust the off period ratio, the emission driver may provide an emission signal having at least one off-level pulse to each pixel in each frame period, and may also adjust a width of the off-level pulse.

SUMMARY

Some embodiments provide a display device capable of finely adjusting an off period ratio of pixels while reducing power consumption.

According to embodiments, there is provided a display device including a display panel including pixels connected to emission lines, a controller configured to receive a dimming signal, and to generate an emission start signal, a first emission clock signal and a second emission clock signal, and an emission driver configured to provide emission signals to the pixels through the emission lines in response to the emission start signal, the first emission clock signal and the second emission clock signal. The controller is further configured to determine an off period ratio for the pixels in units of two or more frame periods in response to the dimming signal.

In embodiments, the controller may control widths of off-level pulses of the emission start signal in the two or more frame periods such that the pixels do not emit light during one or more non-emission periods corresponding to the off period ratio in the two or more frame periods.

In embodiments, the controller may generate the emission start signal having N off-level pulses in each frame period, and may determine the off period ratio in units of M frame periods in response to the dimming signal, where Nis an integer greater than 0, and M is an integer greater than 1. The controller may control widths of M*N off-level pulses of the emission start signal based on the off period ratio such that a ratio of a sum of the widths of the M*N off-level pulses of the emission start signal to a time length of the M frame periods becomes equal to the off period ratio.

In embodiments, the controller may generate the emission start signal having two off-level pulses in each frame period, and may determine the off period ratio in units of two frame periods in response to the dimming signal. The controller may control widths of four off-level pulses of the emission start signal based on the off period ratio such that a ratio of a sum of the widths of the four off-level pulses of the emission start signal to a time length of the two frame periods becomes equal to the off period ratio.

In embodiments, a cycle of each of the first emission clock signal and the second emission clock signal may correspond to eight horizontal times.

In embodiments, the first emission clock signal may include an on-level pulse having a width corresponding to one horizontal time after three horizontal times from a time point at which the second emission clock signal is changed from an on-level to an off-level, and the second emission clock signal may include an on-level pulse having a width corresponding to one horizontal time after three horizontal times from a time point at which the first emission clock signal is changed from the on-level to the off-level.

In embodiments, the emission driver may apply a same one of the emission signals to two or more emission lines of the emission lines.

In embodiments, a number of the emission lines may be K, and the display panel may include K rows of the pixels respectively connected to the K emission lines, where K is an integer greater than or equal to 4. The emission driver may include K/4 stages that sequentially output the emission signals, and each of the K/4 stages may output a same one of the emission signals to four rows of the pixels through four emission lines of the K emission lines.

In embodiments, the controller may receive a mode signal representing a first mode or a second mode. The emission driver may sequentially apply different ones of the emission signals to the emission lines in the first mode, and may apply a same one of the emission signals to four emission lines of the emission lines in the second mode.

In embodiments, the controller may increase a cycle of each of the first and second emission clock signals in the second mode such that the cycle of each of the first and second emission clock signals in the second mode corresponds to four times a cycle of each of the first and second emission clock signals in the first mode.

In embodiments, a cycle of each of the first emission clock signal and the second emission clock signal in the first mode may correspond to two horizontal times, and a cycle of each of the first emission clock signal and the second emission clock signal in the second mode may correspond to eighth horizontal times.

In embodiments, a number of the emission lines may be K, and the emission driver may include K stages, where K is an integer greater than or equal to 4. The display panel may further include line connection switches configured to separate the K emission lines from each other in the first mode, and to connect the K emission lines to each other in units of four emission lines in the second mode. The emission driver may further include stage connection switches configured to cascade-connect the K stages in the first mode, and to cascade-connect K/4 stages of the K stages in the second mode.

In embodiments, the controller may receive a mode signal representing a first mode or a second mode. The emission driver may apply a same one of the emission signals to two emission lines of the emission lines in the first mode, and may apply a same one of the emission signals to four emission lines of the emission lines in the second mode.

In embodiments, the controller may increase a cycle of each of the first and second emission clock signals in the second mode such that the cycle of each of the first and second emission clock signals in the second mode corresponds to twice a cycle of each of the first and second emission clock signals in the first mode.

In embodiments, a cycle of each of the first emission clock signal and the second emission clock signal in the first mode may correspond to four horizontal times, and a cycle of each of the first emission clock signal and the second emission clock signal in the second mode may correspond to eighth horizontal times.

In embodiments, a number of the emission lines may be K, and the emission driver may include K/2 stages, where K is an integer greater than or equal to 4. The display panel may further include line connection switches configured to connect the K emission lines to each other in units of two emission lines in the first mode, and to connect the K emission lines to each other in units of four emission lines in the second mode. The emission driver may further include stage connection switches configured to cascade-connect the K/2 stages in the first mode, and to cascade-connect K/4 stages of the K/2 stages in the second mode.

According to embodiments, there is provided a display device including a display panel including pixels connected to emission lines, a controller configured to receive a dimming signal and a mode signal representing a first mode or a second mode, and to generate an emission start signal, a first emission clock signal and a second emission clock signal, and an emission driver configured to provide emission signals to the pixels through the emission lines in response to the emission start signal, the first emission clock signal and the second emission clock signal. The controller is further configured to determine an off period ratio for the pixels in units of two or more frame periods in response to the dimming signal. The emission driver applies a same one of the emission signals to a first number of the emission lines in the first mode, and applies a same one of the emission signals to a second number of the emission lines in the second mode.

In embodiments, the controller may control widths of off-level pulses of the emission start signal in the two or more frame periods such that the pixels do not emit light during one or more non-emission periods corresponding to the off period ratio in the two or more frame periods.

In embodiments, the first number may be one, and the second number may be four. The controller may increase a cycle of each of the first and second emission clock signals in the second mode such that the cycle of each of the first and second emission clock signals in the second mode corresponds to four times a cycle of each of the first and second emission clock signals in the first mode.

In embodiments, the first number may be two, and the second number may be four. The controller may increase a cycle of each of the first and second emission clock signals in the second mode such that the cycle of each of the first and second emission clock signals in the second mode corresponds to twice a cycle of each of the first and second emission clock signals in the first mode.

As described above, in a display device according to embodiments, a cycle (or a period) of each emission clock signal may be increased (e.g., corresponding to eight horizontal times), and an off period ratio for pixels may be determined in units of two or more frame periods. Accordingly, power consumption of an emission driver and the display device may be reduced, and the off period ratio may be finely or minutely adjusted.

In accordance with one or more other embodiments, a method for controlling a display device includes receiving a control signal; generating an emission start signal; and controlling pixels based on the emission start signal. The emission start signal includes a plurality of on-level signals and off-level pulses included within a plurality of frame periods, each of the off-level pulses having a duration that includes a plurality of horizontal times. Generating the emission start signal includes increasing a width of at least one of the off-level pulses based on the control signal, the width of the at least one off-level pulse increased by a first number of the horizontal times to produce an average frame period that is increased by a second number of the horizontal times less than the first number of horizontal times.

In embodiments, an off period ratio for the pixels may be equal to a sum of the widths of the off-level pulses included within the plurality of frame periods divided by a time length of the plurality of frame periods. Each of the horizontal times may corresponds to a duration of an emission clock pulse that controls generation of the emission start signal. The first number of horizontal times may be eight and the second number of horizontal times may be four. The plurality of frames may be two or more. The control signal may be a dimming signal or a low power mode signal.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
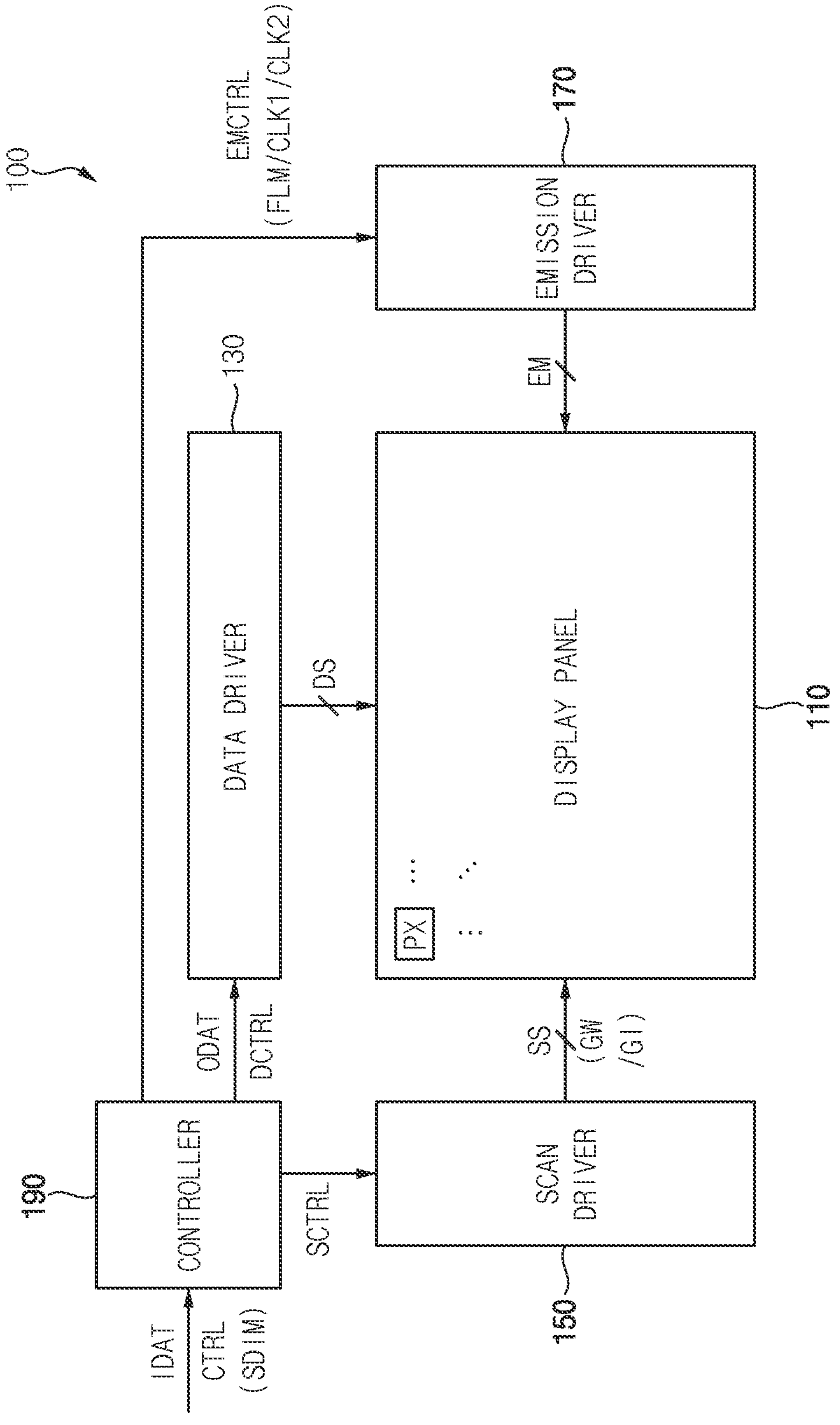
FIG. 1 is a block diagram illustrating a display device according to embodiments.
Figure 2:
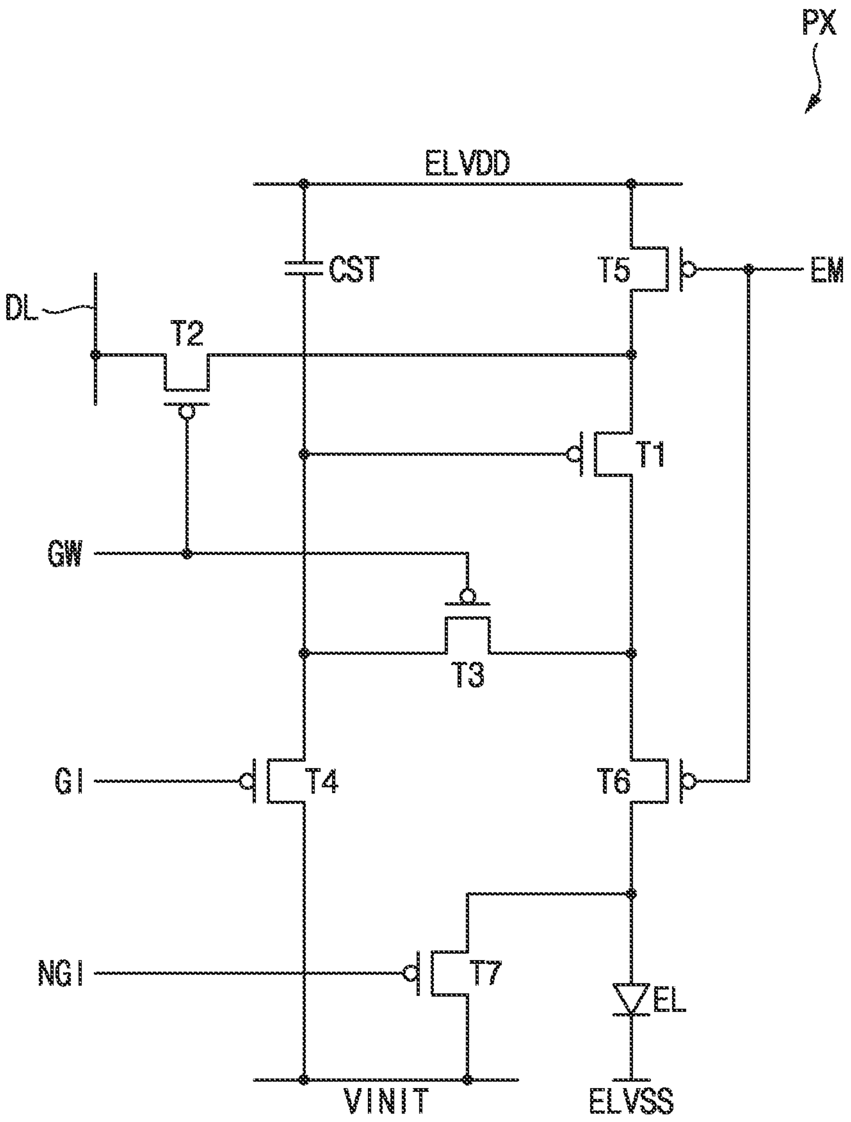
FIG. 2 is a circuit diagram illustrating an example of a pixel included in a display device according to embodiments.
Figure 3:
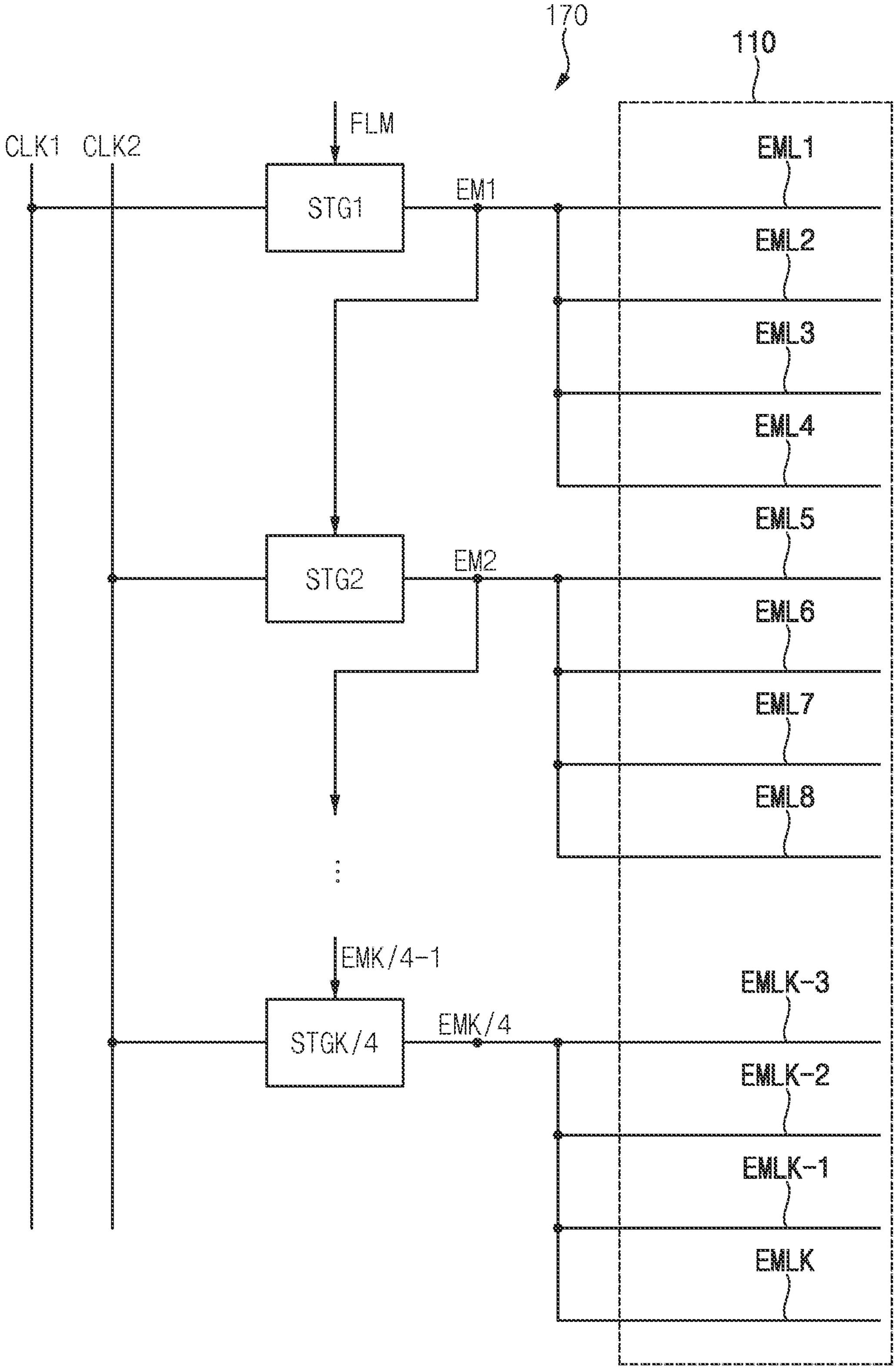
FIG. 3 is a block diagram illustrating an emission driver according to embodiments.
Figure 4:
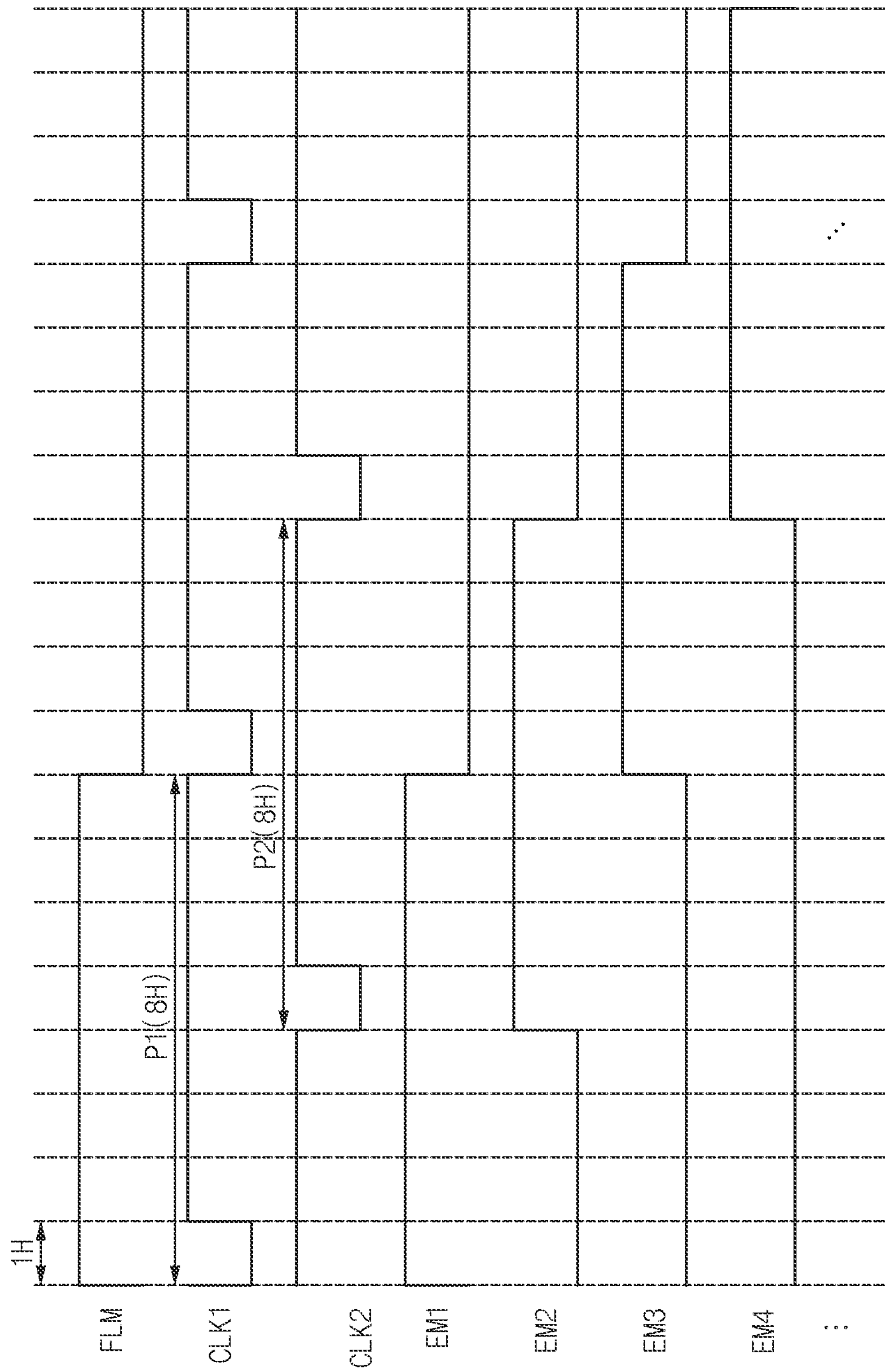
FIG. 4 is a timing diagram for describing an example of an operation of an emission driver according to embodiments.
Figure 5:
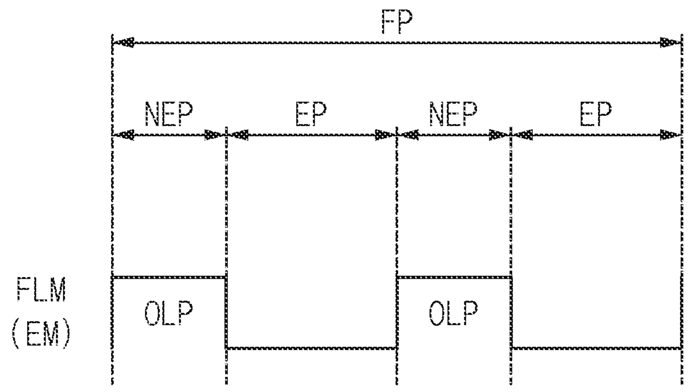
FIG. 5 is a diagram illustrating an example of an emission start signal (or an emission signal) in each frame period.
Figure 6:
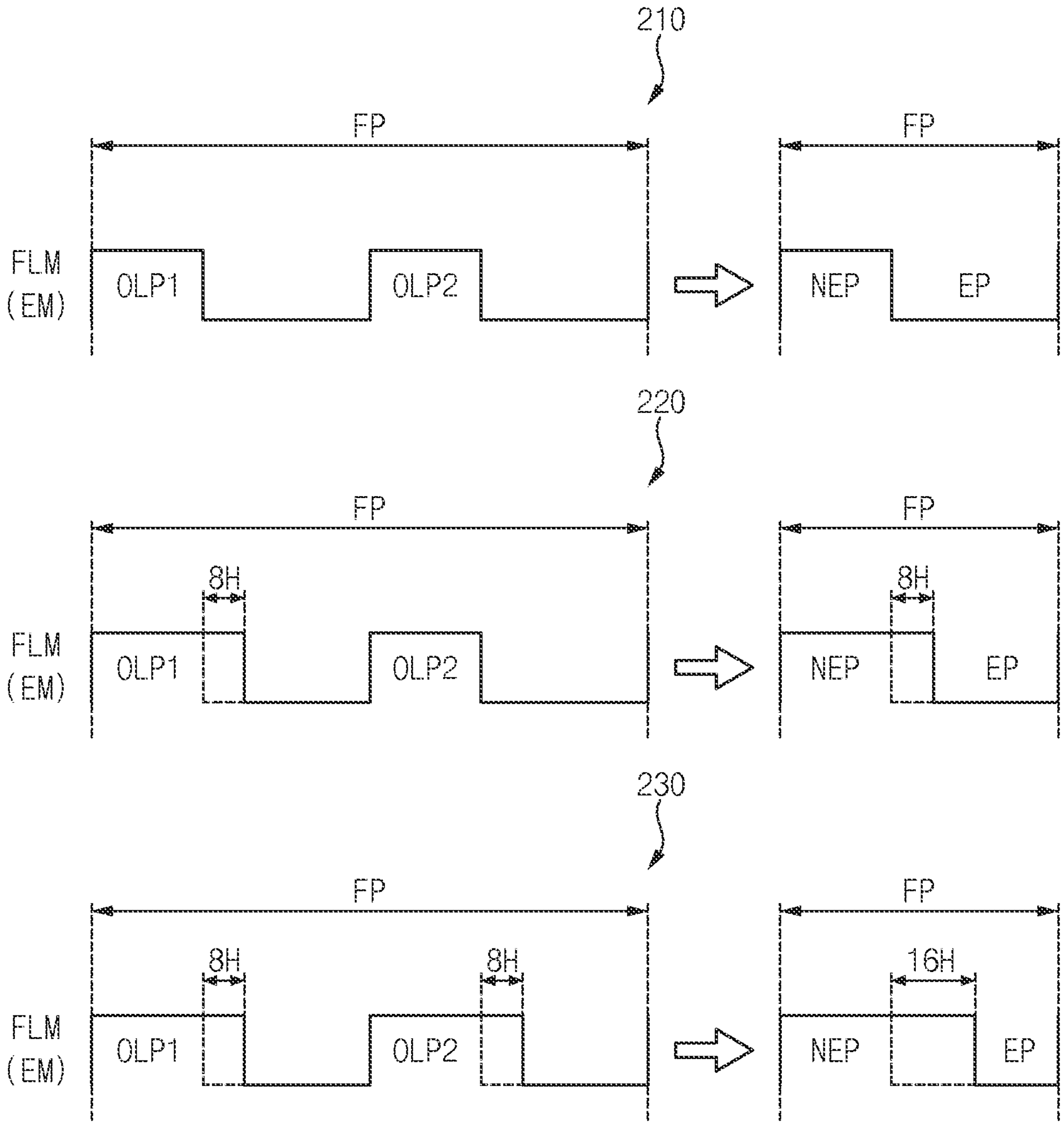
FIG. 6 is a diagram illustrating examples of an emission start signal and examples of lengths of emission and non-emission periods in each frame period of a proposed display device in a case where an off period ratio is determined in units of one frame period.
Figure 7:
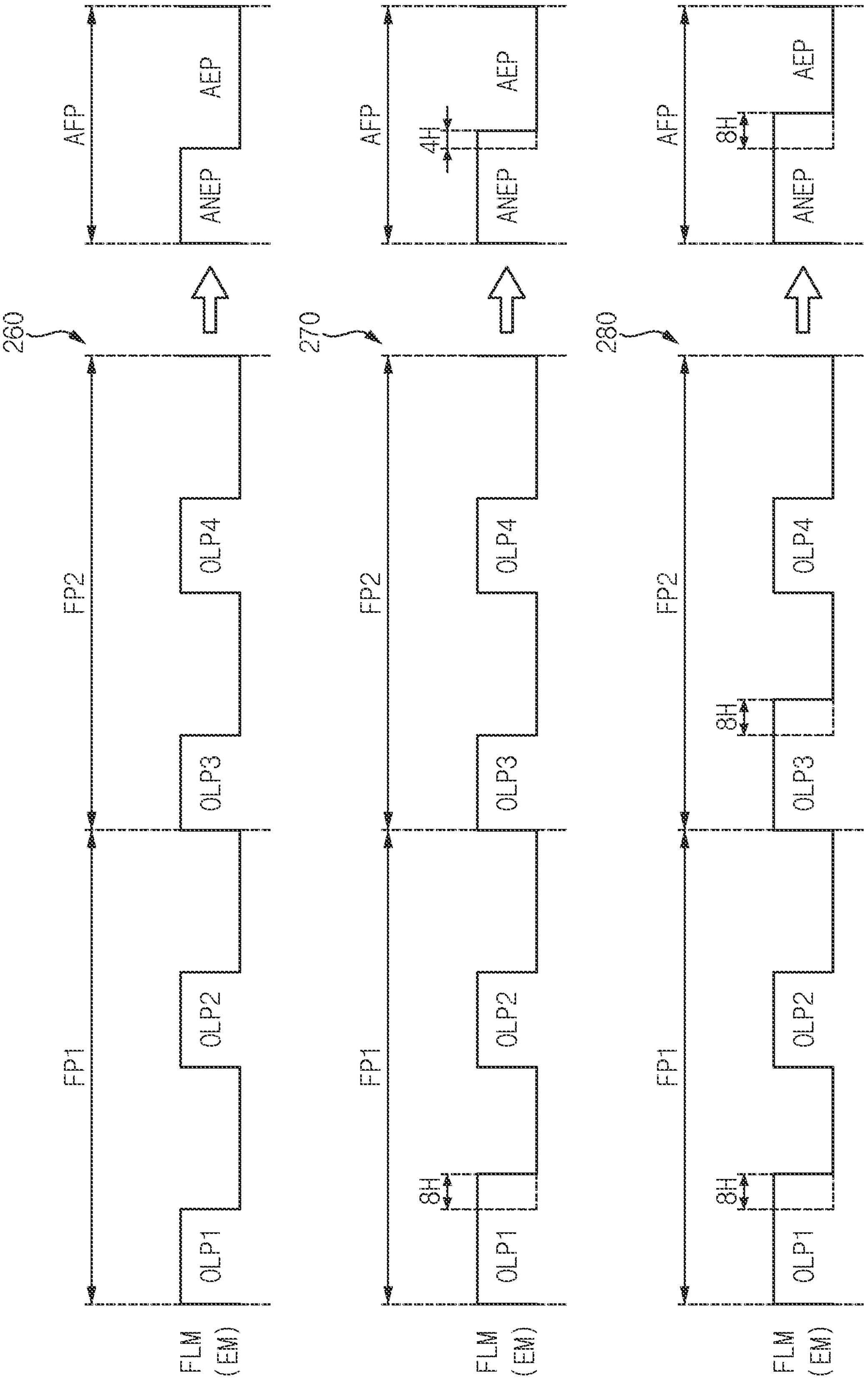
FIG. 7 is a diagram illustrating examples of an emission start signal and examples of average lengths of emission and non-emission periods in each frame period in a case where an off period ratio is determined in units of two frame periods according to embodiments.

FIG. 1 is a block diagram illustrating a display device according to embodiments, FIG. 2 is a circuit diagram illustrating an example of a pixel included in a display device according to embodiments, FIG. 3 is a block diagram illustrating an emission driver according to embodiments, FIG. 4 is a timing diagram for describing an example of an operation of an emission driver according to embodiments, FIG. 5 is a diagram illustrating an example of an emission start signal (or an emission signal) in each frame period, FIG. 6 is a diagram illustrating examples of an emission start signal and examples of lengths of emission and non-emission periods in each frame period in a case where an off period ratio is determined in units of one frame period, and FIG. 7 is a diagram illustrating examples of an emission start signal and examples of average lengths of emission and non-emission periods in each frame period in a case where an off period ratio is determined in units of two frame periods according to embodiments.

Referring to FIG. 1, a display device 100 according to embodiments may include a display panel 110 that includes pixels PX, a data driver 130 that provides data signals DS to the pixels PX, a scan driver 150 that provides scan signals SS to the pixels PX, an emission driver 170 that provides emission signals EM to the pixels PX, and a controller 190 that controls the data driver 130, the scan driver 150 and the emission driver 170.

The display panel 110 may include data lines, scan lines, emission lines and the pixels PX connected thereto. In some embodiments, each pixel PX may include a light emitting element EL, and in such a case the display panel 110 may be a light emitting display panel. However, the display panel 110 is not limited to the light emitting display panel, and may be any suitable display panel.

For example, as illustrated in FIG. 2, each pixel PX may include a driving transistor T1, switching transistor T2, a compensating transistor T3, and a storage capacitor CST. The driving transistor T1 generates a driving current. The switching transistor T2 transfers a data signal DS carried on the data line DL to a source of the driving transistor T1 in response to a writing signal GW. The compensating transistor T3 diode-connects the driving transistor T1 in response to the writing signal GW. The storage capacitor CST stores the data signal DS transferred through the switching transistor T2 and the diode-connected driving transistor T1.

The pixel PX may further include a gate initializing transistor T4, a first emission transistor T5, a second emission transistor T6, and an anode initializing transistor T7. The gate initializing transistor T4 provides an initialization voltage VINIT to the storage capacitor CST and a gate of the driving transistor T1 in response to a first initialization signal GI. The first emission transistor T5 connects a line of a first power supply voltage ELVDD to a source of the driving transistor T1 in response to the emission signal EM. The second emission transistor T6 connects a drain of the driving transistor T1 to the light emitting element EL in response to the emission signal EM. The anode initializing transistor T7 provides the initialization voltage VINIT to the light emitting element EL in response to a second initialization signal NGI. In operation, the light emitting element EL emits light based on the driving current flowing from the line of the first power supply voltage ELVDD to a line of a second power supply voltage ELVSS.

In some embodiments, the second initialization signal NGI may be the first initialization signal GI for the next pixel row. Although FIG. 2 illustrates an example where the switching transistor T2 and the compensating transistor T3 receive the same writing signal GW, according to embodiments, the compensating transistor T3 may receive a compensation signal different from the writing signal GW applied to the switching transistor T2. Further, FIG. 2 illustrates an example where the gate initializing transistor T4 and the anode initializing transistor T7 apply the same initialization voltage VINIT. In other embodiments, the anode initializing transistor T7 may apply an anode initialization voltage different from the initialization voltage VINIT applied by the gate initializing transistor T4.

In some embodiments, as illustrated in FIG. 2, the transistors T1 through T7 of each pixel PX may be implemented with p-type metal-oxide-semiconductor (PMOS) transistors. In other embodiments, at least a portion of the transistors T1 through T7 of each pixel PX may be implemented with n-type metal-oxide-semiconductor (NMOS) transistors. For example, the compensating transistor T3 and the gate initializing transistor T4 may be implemented with the NMOS transistors, and the remaining transistors T1, T2, T5, T6 and T7 may be implemented with the PMOS transistors.

Further, in some embodiments, the light emitting element EL may be an organic light emitting diode (OLED), but is not limited thereto. For example, the light emitting element EL may be a nano light emitting diode (NED), a quantum dot (QD) light emitting diode, a micro light emitting diode, an inorganic light emitting diode, or any other suitable light emitting element. Additionally, although FIG. 2 illustrates an example where each pixel PX may have a 7T1C structure including the seven transistors T1 through T7 and one capacitor CST, each pixel PX of the display device 100 according to embodiments is not limited to the 7T1C structure illustrated in FIG. 2, and may have a different pixel structure which includes more or fewer transistors and, in some cases, more than one capacitor.

The data driver 130 may generate the data signals DS based on output image data ODAT and a data control signal DCTRL received from the controller 190. The data driver 130 may provide the data signals DS to the pixels PX through the data lines. In some embodiments, the data control signal DCTRL may include, but is not limited to, an output data enable signal, a horizontal start signal and a load signal. In some embodiments, the data driver 130 and the controller 190 may be implemented with a single integrated circuit, and, for example, the single integrated circuit may be referred to as a timing controller embedded data driver (TED). In other embodiments, the data driver 130 and the controller 190 may be implemented with separate integrated circuits.

The scan driver 150 may generate the scan signals SS based on a scan control signal SCTRL received from the controller 190. The scan signals SS may be provided to the pixels PX through the scan lines. In some embodiments, the scan control signal SCTRL may include, but is not limited to, a scan start signal and a scan clock signal. In some embodiments, the scan signals SS may include the writing signals GW and/or the initialization signals GI and NGI illustrated in FIG. 2. In some embodiments, the scan driver 150 may be integrated or formed in a peripheral portion of the display panel 110. In other embodiments, the scan driver 150 may be implemented with one or more integrated circuits.

The emission driver 170 may generate the emission signals EM based on an emission control signal EMCTRL received from the controller 190, and may provide the emission signals EM to the pixels PX through the emission lines. In some embodiments, the emission control signal EMCTRL may include, but is not limited to, an emission start signal FLM, a first emission clock signal CLK1 and a second emission clock signal CLK2. The emission driver 170 may provide the emission signals EM to the pixels PX through the emission lines in response to the emission start signal FLM, the first emission clock signal CLK1 and the second emission clock signal CLK2. In some embodiments, the emission driver 170 may be integrated or formed in the peripheral portion of the display panel 110. In other embodiments, the emission driver 170 may be implemented with one or more integrated circuits.

In some embodiments, the emission driver 170 may sequentially provide the emission signals EM to the pixels PX in units of two or more rows of the pixels PX. Thus, in this case, the emission driver 170 may apply the same emission signal EM to two or more emission lines.

For example, as illustrated in FIG. 3, the display panel 110 may include K rows of the pixels PX respectively connected to K emission lines EML1, EML2, EML3, EML4, EML5, EML6, EML7, EML8, . . . , EMLK−3, EMLK−2, EMLK−1 and EMLK, where K is an integer greater than or equal to 4. The emission driver 170 may further include K/4 stages STG1, STG2, . . . , STGK/4 that sequentially output corresponding ones of the emission signals EM. Each of the K/4 stages STG1, STG2, . . . , STGK/4 may apply the same emission signal EM to four rows of the pixels PX through four emission lines. For example, a first stage STG1 may apply a first emission signal EM1 to first through fourth emission lines EML1, EML2, EML3 and EML4, and thus may provide the first emission signal EM1 to first through fourth rows of the pixels PX connected to the first through fourth emission lines EML1, EML2, EML3 and EML4. Further, a second stage STG2 may apply a second emission signal EM2 to fifth through eighth emission lines EML5, EML6, EML7 and EML8, and thus may provide the second emission signal EM2 to fifth through eighth rows of the pixels PX connected to the fifth through eighth emission lines EML5, EML6, EML7 and EML8. In addition, a (K/4)-th stage STGK/4 may apply a (K/4)-th emission signal EMK/4 to (K−3)-th through K-th emission lines EMLK-3, EMLK-2, EMLK-1 and EMLK, and thus may provide the (K/4)-th emission signal EMK/4 to (K−3)-th through K-th rows of the pixels PX connected to the (K−3)-th through K-th emission lines EMLK-3, EMLK-2, EMLK-1 and EMLK.

Further, the first through (K/4)-th stages STG1 through STGK/4 may sequentially output the first through (K/4)-th emission signals EM1 through EMK/4 by shifting (or delaying) the emission start signal FLM in response to the first emission clock signal CLK1 and the second emission clock signal CLK2. In some embodiments, odd-numbered stages STG1, . . . may operate in response to the first emission clock signal CLK1, and even-numbered stages STG2, . . . may operate in response to the second emission clock signal CLK2. For example, as illustrated in FIGS. 3 and 4, the first stage STG1 may output the emission start signal FLM as the first emission signal EM1 in response to the first emission clock signal CLK1. Further, the second stage STG2 may output the second emission signal EM2 by shifting the first emission signal EM1 by a plurality of (e.g., four) horizontal times in response to the second emission clock signal CLK2. Further, a third stage may output a third emission signal EM3 by shifting the second emission signal EM2 by four horizontal times in response to the first emission clock signal CLK1. Further, a fourth stage may output a fourth emission signal EM4 by shifting the third emission signal EM3 by four horizontal times in response to the second emission clock signal CLK2. In addition, for example, the (K/4)-th stage STGK/4 may output the (K/4)-th emission signal EMK/4 by shifting a (K/4-1)-th emission signal EMK/4-1 by four horizontal times in response to the second emission clock signal CLK2. In this example, shifting occurs by four horizontal times, but the shifting may be performed by a different number of horizontal times in other embodiments.

In some embodiments, to sequentially shift (or delay) the first through (K/4)-th emission signals EM1 through EMK/4 by an interval of four horizontal times, as illustrated in FIG. 4, each of a cycle or a period P1 of the first emission clock signal CLK1 and a cycle or a period P2 of the second emission clock signal CL2 may corresponds to eight horizontal times 8H. In other embodiments, the emission clock signals may have a duration different (more or less) than eight horizontal times. In some display devices which have been proposed, an emission clock signal having a cycle (or a period) corresponding to two horizontal times or four horizontal times may be used. In contrast, the cycle (or the period P1 and P2) of each emission clock signal CLK1 and CLK2 in the display device 100 according to embodiments may be increased compared with the cycle of the emission clock signal in the proposed display devices. Accordingly, in the display device 100 according to embodiments, power consumption of the emission driver 170 and the display device 100 caused by clock transition may be reduced.

Further, in some embodiments, as illustrated in FIG. 4, the first emission clock signal CLK1 may include an on-level pulse (e.g., a pulse having a low level for PMOS) after a plurality (e.g., three) of horizontal times from a time point at which the second emission clock signal CLK2 is changed from an on-level (e.g., a low level) to an off-level (e.g., a high level). The width of the on-level pulse may correspond to a predetermined time, e.g., one horizontal time 1H. Additionally, the second emission clock signal CLK2 includes an on-level pulse (e.g., a pulse having a low level for PMOS) after a plurality (e.g., three) of horizontal times from a time point at which the first emission clock signal CLK1 is changed from the on-level (e.g., the low level) to the off-level (e.g., the high level). The width of the on-level pulse of the second emission clock signal may correspond to a predetermined time, e.g., one horizontal time 1H. Here, one horizontal time 1H may be a time allocated for one pixel row. For example, one horizontal time 1H may be determined by dividing a time length of one frame period by the number of pixel rows of the display panel 110.

The controller 190 (e.g., a timing controller (TCON)) may receive input image data IDAT and a control signal CTRL from an external host processor (e.g., an application processor (AP), a graphics processing unit (GPU) or a graphics card). In some embodiments, the control signal CTRL may include, but is not limited to, a vertical synchronization signal, a horizontal synchronization signal, an input data enable signal, a master clock signal, etc. The controller 190 may generate the output image data ODAT, the data control signal DCTRL, the scan control signal SCTRL and the emission control signal EMCTRL based on the input image data IDAT and the control signal CTRL. The controller 190 may control operation of the data driver 130 by providing the output image data ODAT and the data control signal DCTRL to the data driver 130, may control operation of the scan driver 150 by providing the scan control signal SCTRL to the scan driver 150, and may control operation of the emission driver 170 by providing the emission control signal EMCTRL to the emission driver 170.

In some embodiments, the controller 190 may generate the emission start signal FLM having N off-level pulses (e.g., pulses having the high level) in each frame period, where N is an integer greater than 0. The emission driver 170 may provide the emission signal EM having N off-level pulses (e.g., pulses having the high level) to each pixel PX in each frame period in response to the emission start signal FLM having the N off-level pulses in each frame period.

For example, as illustrated in FIG. 5, the controller 190 may generate the emission start signal FLM having two off-level pulses OLP in each frame period FP. The emission driver 170 may provide the emission signal EM having two off-level pulses OLP to each pixel PX in each frame period FP in response to the emission start signal FLM having the two off-level pulses OLP. Each pixel PX may not emit light in response to the emission signal EM having an off-level (e.g., a high level), and may emit light in response to the emission signal EM having an on-level (e.g., a low level). A period in which the emission signal EM having the off-level may correspond to a non-emission period NEP in which the pixel PX does not emit light, and a period in which the emission signal EM having the on-level may correspond to an emission period EP in which the pixel PX emits light. The non-emission period NEP and the emission period EP may be repeated in each frame period FP. Although FIG. 5 illustrates an example where the emission start signal FLM or the emission signal EM has two off-level pulses OLP in each frame period FP, in other embodiments the emission start signal FLM or the emission signal EM may have a different number of off-level pulses OLP in each frame period FP, which, for example, may be one off-level pulse or more than two off-level pulses.

In the display device 100 according to embodiments, the control signal CTRL received by the controller 190 may include a dimming signal SDIM representing a dimming level (or a luminance level). The controller 190 may determine an off period ratio for the pixels PX corresponding to the dimming level (or the luminance level) in response to the dimming signal SDIM. Here, the off period ratio may mean a ratio of a time length of the non-emission period NEP to a time length equal to the sum of the emission and non-emission periods EP and NEP (or a time length of at least one frame period FP). Accordingly, the off period ratio may be referred to as an active matrix organic light emitting diode (AMOLED) off ratio (AOR).

Further, to adjust the time length of the non-emission periods NEP with the off period ratio corresponding to the dimming level (or the luminance level) represented by the dimming signal SDIM, the controller 190 may adjust widths of the off-level pulses OLP of the emission start signal FLM (or the emission signal EM). A technique that implements a desired dimming level (or a desired luminance level) by adjusting the widths of the off-level pulses OLP of the emission signal EM may be referred to as an AMOLED impulsive driving (AID) dimming technique.

In some display devices which have been proposed that use an AID dimming technique, an off period ratio may be determined in units of one frame period, and widths of off-level pulses may be adjusted within one frame period based on the off period ratio. For example, as illustrated in a first timing diagram 210 of FIG. 6, an emission start signal FLM (or an emission signal EM) may have a first off-level pulse OLP1 and a second off-level pulse OLP2 in one frame period FP. In this case, in the frame period FP, the time length of non-emission periods NEP may correspond to a sum of widths of the first and second off-level pulses OLP1 and OLP2. In a case where a dimming level is increased (or in a case where a luminance level is decreased), as illustrated in a second timing diagram 220 of FIG. 6, proposed display devices may increase the width of the first off-level pulse OLP1.

Further, in a case where each emission clock signal has a cycle corresponding to eight horizontal times 8H, the proposed display devices may increase the width of the first off-level pulse OLP1 by an interval of eight horizontal times 8H. If the width of the first off-level pulse OLP1 is increased by eight horizontal times 8H, the time length of the non-emission periods NEP may be increased by eight horizontal times 8H, and a time length of emission periods EP may be decreased by eight horizontal times 8H.

In addition, in a case where the dimming level is further increased (or in a case where the luminance level is further decreased), as illustrated in a third timing diagram 230 of FIG. 6, the proposed display devices may also increase the width of the second off-level pulse OLP2 by the interval of eight horizontal times 8H. If the width of each of the first off-level pulse OLP1 and the second off-level pulse OLP2 is increased by eight horizontal times 8H, the time length of the non-emission periods NEP may be increased by sixteen horizontal times 16H, and the time length of the emission periods EP may be decreased by sixteen horizontal times 16H.

As described above, in the proposed display devices, since the width of each off-level pulse OLP1 and OLP2 is adjusted by the interval of eight horizontal times 8H, the time length of the non-emission periods NEP in each frame period FP may be adjusted by the interval of eight horizontal times 8H.

However, unlike these proposed display devices that determine the off period ratio in units of one frame period FP, in the display device 100 according to embodiments, the controller 190 may determine the off period ratio for the pixels PX in units of two or more frame periods in response to the dimming signal SDIM. For example, unlike the proposed display devices that adjust the widths of the off-level pulses OLP1 and OLP2 of the emission start signal FLM within one frame period FP, the controller 190 of the display device 100 according to embodiments may control the widths of the off-level pulses of the emission start signal FLM in the two or more frame periods. As a result, the pixels PX do not emit light during one or more non-emission periods NEP corresponding to the off period ratio in the two or more frame periods. This may result in a substantial reduction in power consumption.

In some embodiments, the controller 190 may generate the emission start signal FLM having N off-level pulses in each frame period, and may determine the off period ratio in units of M frame periods in response to the dimming signal SDIM, where Nis an integer greater than 0, and M is an integer greater than 1. Further, the controller 190 may control widths of M*N off-level pulses of the emission start signal FLM based on the off period ratio such that a ratio of a sum of the widths of the M*N off-level pulses of the emission start signal FLM to a time length of the M frame periods becomes equal to the off period ratio. For example, the controller 190 may generate the emission start signal FLM having two off-level pulses in each frame period, may determine the off period ratio in units of two frame periods in response to the dimming signal SDIM, and may control widths of four off-level pulses of the emission start signal FLM based on the off period ratio. As a result, a ratio of a sum of the widths of the four off-level pulses of the emission start signal FLM to a time length of the two frame periods becomes equal to the off period ratio.

For example, as illustrated in a first timing diagram 260 of FIG. 7, the emission start signal FLM (or the emission signal EM) may have a first off-level pulse OLP1 and a second off-level pulse OLP2 in a first frame period FP1, and may have a third off-level pulse OLP3 and a fourth off-level pulse OLP4 in a second frame period FP2. In the first and second frame periods FP1 and FP2, the time length of the non-emission periods NEP may correspond to a sum of widths of the first through fourth off-level pulses OLP1 through OLP4. In this case, in an average frame period AFP corresponding to an average of the first and second frame periods FP1 and FP2, a time length of an average non-emission period ANEP may correspond to half of the sum of the widths of the first through fourth off-level pulses OLP1 through OLP4.

In a case where the dimming level represented by the dimming signal SDIM is increased (or in a case where the luminance level is decreased), as illustrated in a second timing diagram 270 of FIG. 7, the controller 190 may increase the width of the first off-level pulse OLP1. Since each emission clock signal CLK1 and CLK2 has a cycle corresponding to eight horizontal times 8H, the controller 190 may increase the width of the first off-level pulse OLP1 by an interval of eight horizontal times 8H. If the width of the first off-level pulse OLP1 is increased by eight horizontal times 8H, the time length of the non-emission periods NEP in the first frame period FP1 may be increased by eight horizontal times 8H, but the time length of the non-emission periods NEP in the second frame period FP2 may not be increased. Thus, in the average frame period AFP corresponding to the average of the first and second frame periods FP1 and FP2, the time length of the average non-emission period ANEP may be increased by four horizontal times 4H, and a time length of an average emission period AEP may be decreased by four horizontal times 4H.

In addition, in a case where the dimming (or luminance) level represented by the dimming signal SDIM is further increased (or in a case where the luminance level is further decreased), as illustrated in a third timing diagram 280 of FIG. 7, the controller 190 may further increase the width of the third off-level pulse OLP3 by the interval of eight horizontal times 8H. If the width of each of the first off-level pulse OLP1 and the third off-level pulse OLP3 is increased by eight horizontal times 8H, in the average frame period AFP, the time length of the average non-emission period ANEP may be increased by eight horizontal times 8H, and the time length of the average emission period AEP may be decreased by eighth horizontal times 8H.

As described above, in the display device 100 according to embodiments, although the width of each off-level pulse OLP1 through OLP4 is adjusted by the interval of eight horizontal times 8H, since the off period ratio is determined in units of the two frame periods FP1 and FP2, and the widths of the off-level pulses OLP1 through OLP4 in the two frame periods FP1 and FP2 are adjusted based on the off period ratio, the time length of the average non-emission period ANEP may be adjusted by the interval of four horizontal times 4H. Accordingly, compared with the off period ratio determined in units of one frame period FP as illustrated in FIG. 6, in the display device 100 according to embodiment as illustrated in FIG. 7, the time length of the average non-emission period ANEP may be finely or minutely adjusted, and the off period ratio may be finely or minutely adjusted.

As described above, in the display device 100 according to embodiments, compared with a cycle (or a period) of an emission clock signal in proposed display devices having two horizontal times or four horizontal times, the cycle (or the period) of each emission clock signal CLK1 and CLK2 may be increased to a number greater than four, e.g., eight horizontal times. Accordingly, the power consumption of the emission driver 170 and the display device 100 may be reduced. As previously indicated, the duration of one horizontal time may correspond to the duration of an on-level pulse of each of the emission clock signals.

Further, in the display device 100 according to embodiments, the off period ratio may be determined in units of two or more frame periods. Accordingly, although the cycle of each emission clock signal CLK1 and CLK2 is increased, the time length of the average non-emission period ANEP may be finely or minutely adjusted, and the off period ratio may be finely or minutely adjusted.

Figure 8:
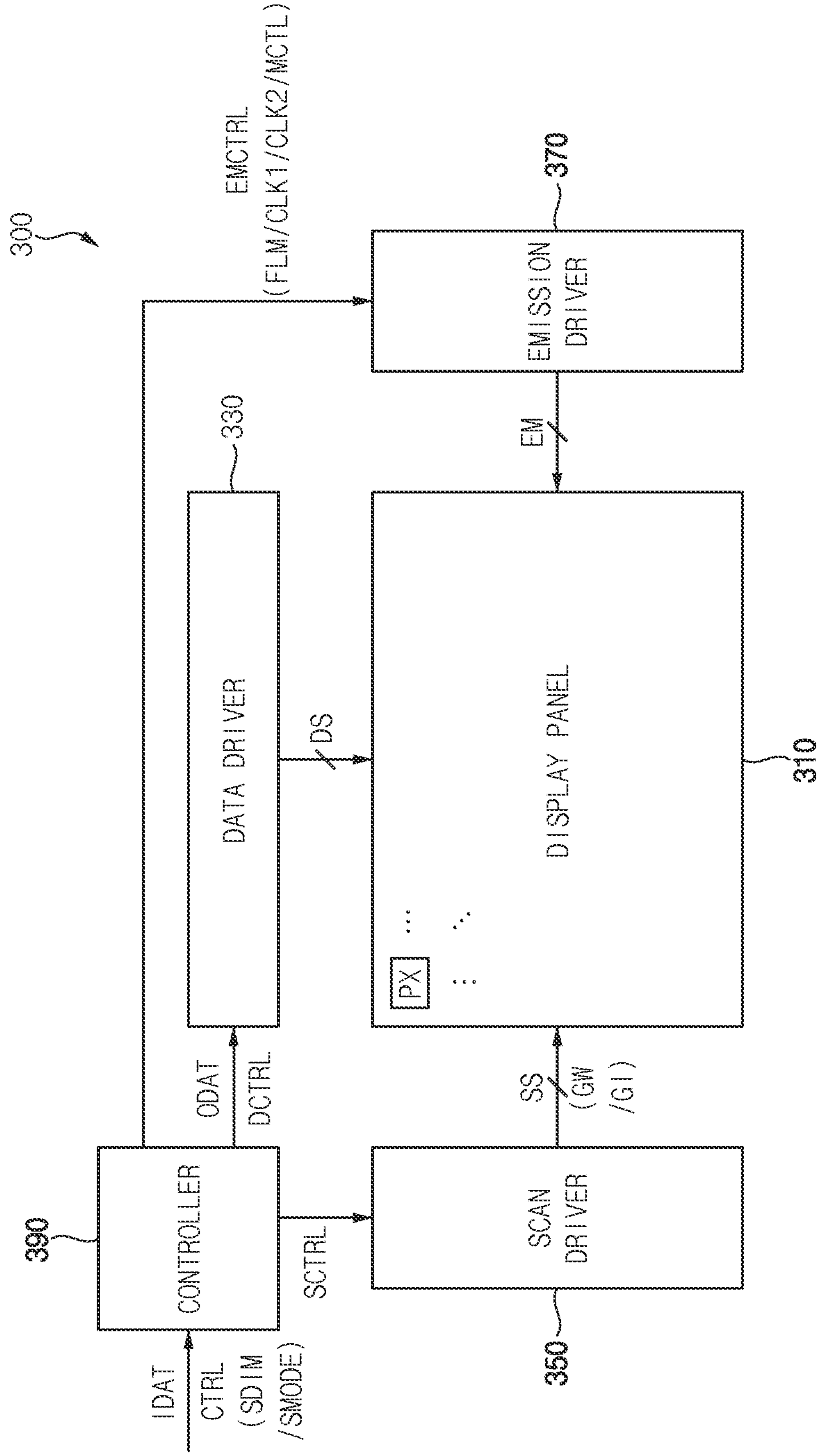
FIG. 8 is a block diagram illustrating a display device according to embodiments.
Figure 9:
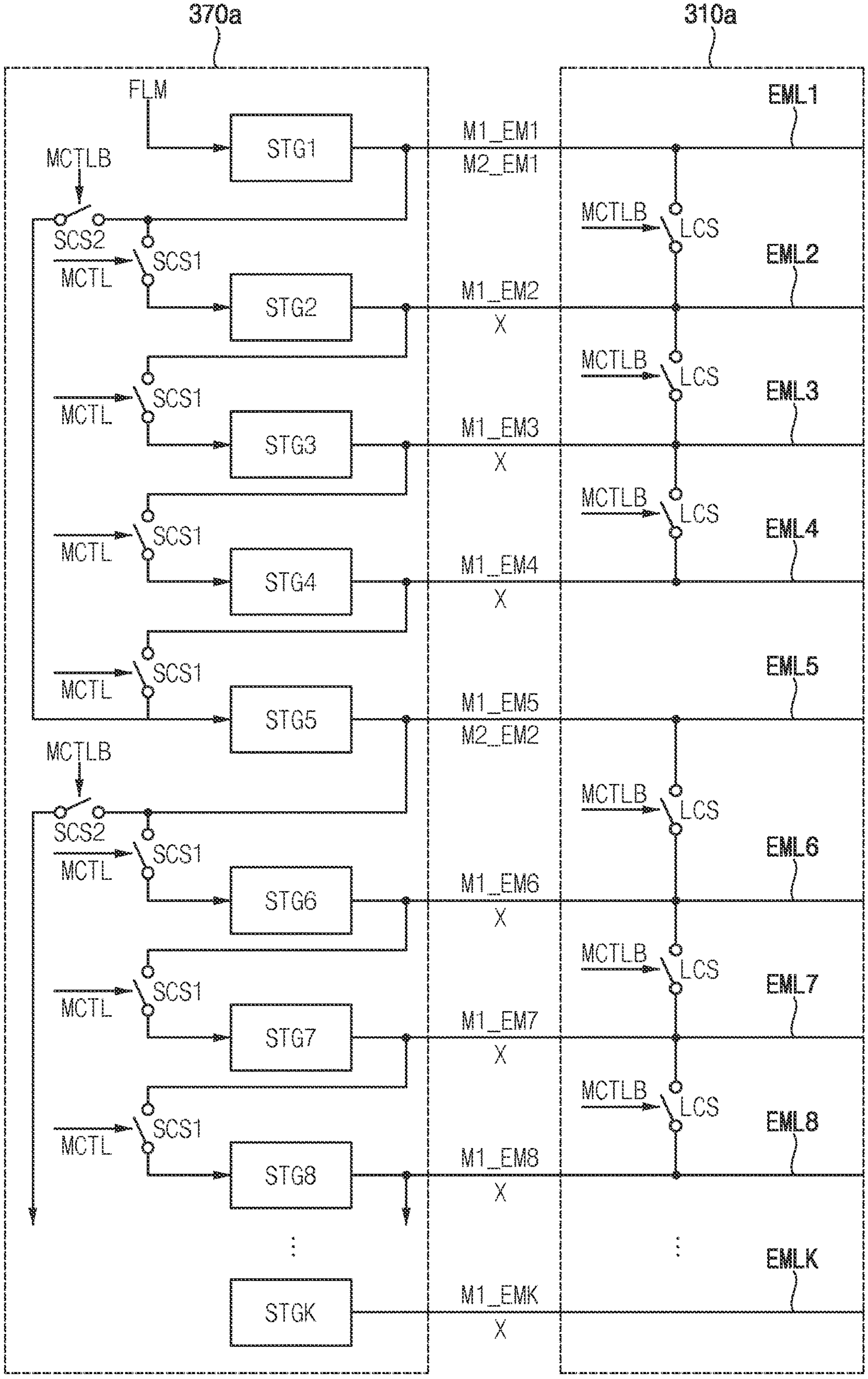
FIG. 9 is a block diagram illustrating an emission driver according to embodiments.
Figure 10:
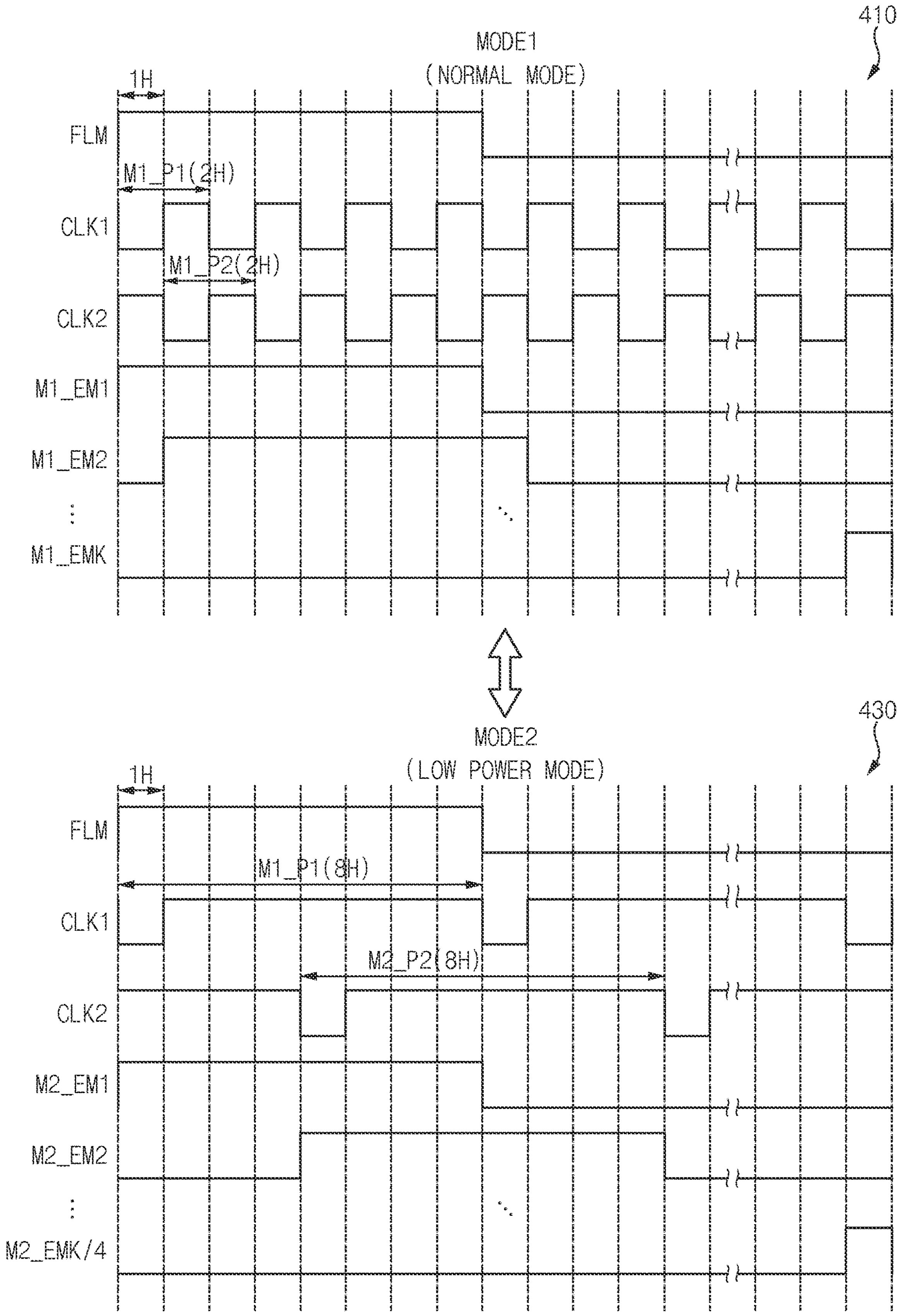
FIG. 10 is a timing diagram for describing an example of operations of an emission driver in a first mode and a second mode according to embodiments.
Figure 11:
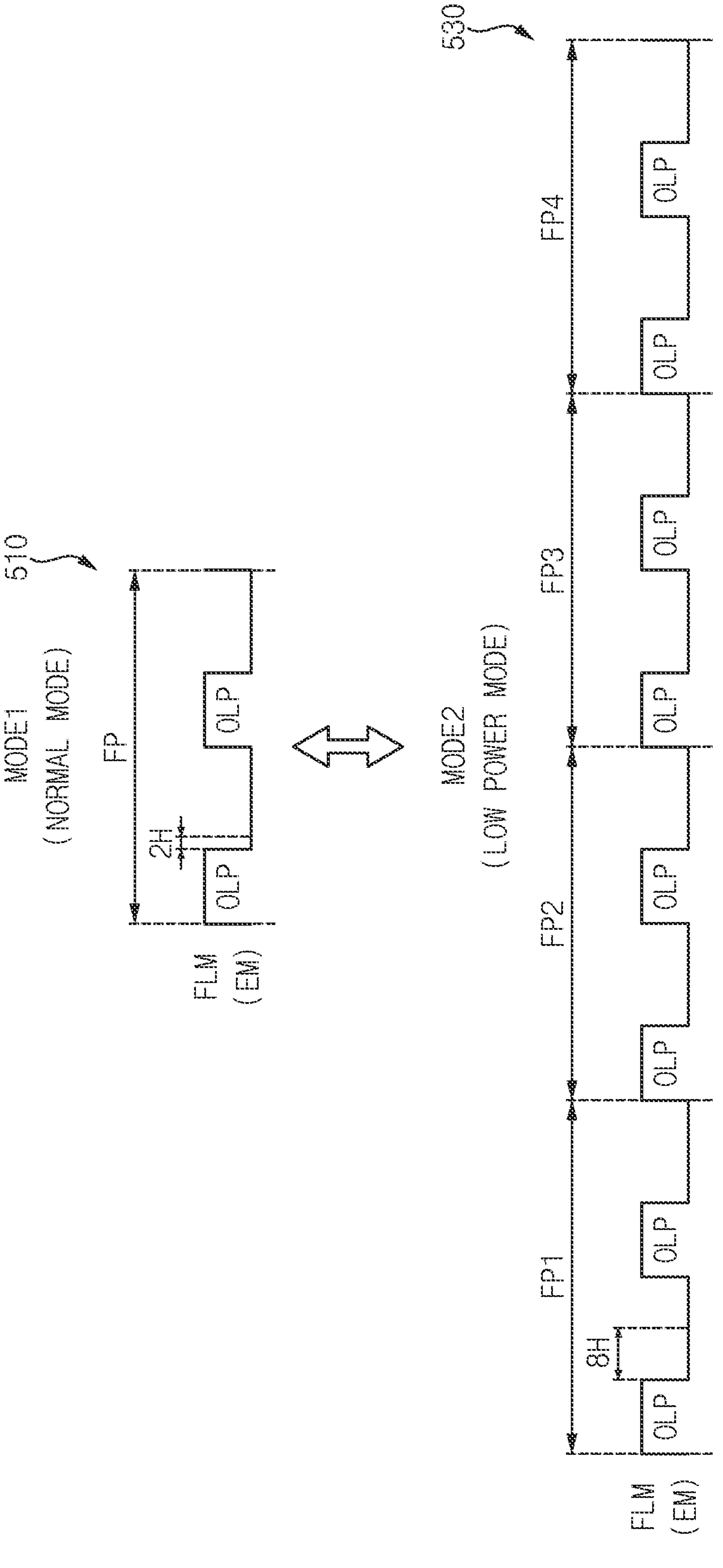
FIG. 11 is a diagram illustrating an example of an emission start signal in a first mode and a second mode according to embodiments.

FIG. 8 is a block diagram illustrating a display device 300 according to embodiments, FIG. 9 is a block diagram illustrating an emission driver according to embodiments, FIG. 10 is a timing diagram for describing an example of operations of an emission driver in a first mode and a second mode according to embodiments, and FIG. 11 is a diagram illustrating an example of an emission start signal in a first mode and a second mode according to embodiments.

Referring to FIG. 8, the display device 300 according to embodiments may include a display panel 310, a data driver 330, a scan driver 350, an emission driver 370 and a controller 390. The display device 300 of FIG. 8 may have a similar configuration and similar operation to a display device 100 of FIG. 1, except that a control signal CTRL received by the controller 390 from an external host processor may further include a mode signal SMODE, and an emission control signal EMCTRL received by the emission driver 370 from the controller 390 may further include a mode control signal MCTL.

The mode signal SMODE may represent multiple modes of operation, e.g., a first mode or a second mode. In some embodiments, the first mode may be, but is not limited to, a normal mode, and the second mode may be, but is not limited to, a low power mode. In some embodiments, the controller 390 may generate the mode control signal MCTL having an on-level when the mode signal SMODE indicates the first mode, and may generate the mode control signal MCTL having an off-level when the mode signal SMODE indicates the second mode. Further, in some embodiments, the controller 390 may further generate an inverted mode control signal having an opposite level to a level of the mode control signal MCTL.

In some embodiments, the controller 390 may increase a cycle of each of first and second emission clock signals CLK1 and CLK2 in the second mode. For example, the cycle of each of the first and second emission clock signals CLK1 and CLK2 in the second mode may correspond to four times a cycle of each of the first and second emission clock signals CLK1 and CLK2 in the first mode. For example, the cycle of each of the first and second emission clock signals CLK1 and CLK2 in the first mode may correspond to two horizontal times, and the cycle of each of the first and second emission clock signals CLK1 and CLK2 in the second mode may correspond to eighth horizontal times.

In some embodiments, the emission driver 370 may sequentially provide the emission signals EM in units of one pixel row of the display panel 310 in the first mode, and may sequentially provide the emission signals EM in units of multiple (e.g., four) pixel rows of the display panel 310 in the second mode. For example, the emission driver 370 may sequentially apply different emission signals EM to emission lines of the display panel 310 in the first mode, and may apply the same emission signal EM to four emission lines of the emission lines in the second mode. To perform these operations, the display panel 310 may include line connection switches for selectively connecting the emission lines, and the emission driver 370 may include stage connection switches for selectively connecting stages of the emission driver 370.

For example, as illustrated in FIG. 9, a display panel 310*a* may include K emission lines EML1, EML2, EML3, EML4, EML5, EML6, EML7, EML8, . . . , EMLK, and an emission driver 370*a* may include K stages STG1, STG2, STG3, STG4, STG5, STG6, STG7, STG8, . . . , STGK, where K is an integer greater than or equal to 4.

The display panel 310*a* may include the line connection switches LCS that separate the K emission lines EML1 through EMLK from each other in the first mode, and connect the K emission lines EML1 through EMLK to each other in units of four emission lines in the second mode. For example, three line connection switches LCS may be disposed per four emission lines (e.g., first through fourth emission lines EML1, EML2, EML3 and EML4). The line connection switches LCS may be turned off (or opened) in response to the inverted mode control signal MCTLB having an off-level in the first mode, and may be turned on (or closed) in response to the inverted mode control signal MCTLB having an on-level in the second mode. If the line connection switches LCS are closed, the four emission lines (e.g., first through fourth emission lines EML1, EML2, EML3 and EML4) may be connected to each other.

The emission driver 370*a* may include the stage connection switches SCS1 and SCS2 that cascade-connect the K stages STG1 through STGK in the first mode, and cascade-connect K/4 stages STG1, STG5, . . . of the K stages STG1 through STGK in the second mode. For example, the emission driver 370*a* may include first stage connection switches SCS1 located between input terminals and output terminals of the K stages STG1 through STGK, and second stage connection switches SCS2 located between input terminals and output terminals of the K/4 stages STG1, STG5, . . . .

The first stage connection switches SCS1 may be turned on (or closed) in response to the mode control signal MCTL having the on-level in the first mode, and may connect an output terminal of a previous stage (e.g., a first stage STG1) to an input terminal of a current stage (e.g., a second stage STG2). The second stage connection switches SCS2 may be turned on (or closed) in response to the inverted mode control signal MCTLB having the on-level in the second mode, and may connect an output terminal of a (4L-3)-th stage (e.g., the first stage STG1) to an input terminal of a (4L+1)-th stage (e.g., a fifth stage STG5), where Lis an integer greater than or equal to 1 and less than K/4.

Accordingly, in the first mode, the first through K-th stages STG1 through STGK may apply first through K-th emission signals M1_EM1, M1_EM2, M1_EM3, M1_EM4, M1_EM5, M1_EM6, M1_EM7, M1_EM8, . . . , M1_EMK to first through K-th emission lines EML1 through EMLK. Further, in the second mode, the first stage STG1 may apply a first emission signal M2_EM1 to the first through fourth emission lines EML1, EML2, EML3 and EML4, and the second through fourth stages STG2, STG3 and STG4 may output no emission signal. Further, the fifth stage STG5 may apply a second emission signal M2_EM2 to fifth through eighth emission lines EML5, EML6, EML7 and EML8, and sixth through eighth stages STG6, STG7 and STG8 may output no emission signal.

Further, the emission driver 370*a* may operate in response to the emission clock signal CLK1 and CLK2 having a cycle corresponding to a first number (e.g., two) horizontal times in the first mode, and may operate in response to the emission clock signal CLK1 and CLK2 having a cycle corresponding to a second number (e.g., eight) horizontal times in the second mode, where the second number of horizontal times is greater than the first number of horizontal times. The first and second numbers of horizontal times may be different from two and eight, respectively, in other embodiments.

For example, as illustrated in a first timing diagram 410 of FIG. 10, in the first mode (or the normal mode), a cycle (or a period) M1_P1 and M1_P2 of each of the first and second emission clock signals CLK1 and CLK2 may correspond to two horizontal times 2H. In the first mode, the first stage STG1 may output the emission start signal FLM as a first emission signal M1_EM1 in response to the first emission clock signal CLK1, the second stage STG2 may output a second emission signal M1_EM2 by shifting the first emission signal M1_EM1 by one horizontal time 1H in response to the second emission clock signal CLK2, and the third stage STG3 may output a third emission signal M1_EM3 by shifting the second emission signal M1_EM2 by one horizontal time 1H in response to the first emission clock signal CLK1. In this manner, in the first mode, the first through K-th stages STG1 through STGK may sequentially output the first through K-th emission signals M1_EM1 through M1_EMK by shifting their input signals by one horizontal time 1H.

Further, as illustrated in a second timing diagram 430 of FIG. 10, in the second mode (or the low power mode), the cycle (or the period) M2_P1 and M2_P2 of each of the first and second emission clock signals CLK1 and CLK2 may correspond to eight horizontal times 8H. In the second mode, the first stage STG1 may output the emission start signal FLM as a first emission signal M2_EM1 in response to the first emission clock signal CLK1, and the fifth stage STG5 may output a second emission signal M2_EM2 by shifting the first emission signal M2_EM1 by four horizontal times in response to the second emission clock signal CLK2. In addition, a ninth stage may output a third emission signal by shifting the second emission signal M2_EM2 by four horizontal times in response to the first emission clock signal CLK1. In this manner, in the second mode, the K/4 stages STG1, STG5, . . . may sequentially output K/4 emission signals M2_EM1, M2_EM2, . . . , M2_EMK/4 by shifting their input signals by four horizontal times.

In addition, in some embodiments, the controller 390 may determine an off period ratio in units of one frame period in response to a dimming signal SDIM in the first mode, and may determine the off period ratio in units of four frame periods in response to the dimming signal SDIM in the second mode.

For example, as illustrated in a first timing diagram 510 of FIG. 11, in the first mode (or the normal mode), the controller 390 may determine the off period ratio in units of one frame period FP, and may control widths of off-level pulses OLP of the emission start signal FLM within one frame period FP based on the off period ratio. In this case, since each emission clock signal CLK1 and CLK2 has the cycle corresponding to two horizontal times 2H in the first mode, the width of each off-level pulse OLP may be adjusted by an interval of two horizontal times 2H, and a time length of a non-emission period of each frame period FP also may be adjusted by the interval of two horizontal times 2H.

Further, as illustrated in a second timing diagram 530 of FIG. 11, in the second mode (or the low power mode), the controller 390 may determine the off period ratio in units of four frame periods FP1, FP2, FP3 and FP4, and may control widths of off-level pulses OLP of the emission start signal FLM in the four frame periods FP1, FP2, FP3 and FP4 based on the off period ratio. In this case, since each emission clock signal CLK1 and CLK2 has the cycle corresponding to eighth horizontal times 8H in the second mode, the width of each off-level pulse OLP may be adjusted by an interval of eight horizontal times 8H. However, if the width of one off-level pulse OLP is adjusted by eighth horizontal times 8H in the four frame periods FP1, FP2, FP3 and FP4, a time length of an average non-emission period of an average frame period may be adjusted by two horizontal times 2H. Thus, although the width of each off-level pulse OLP is adjusted by eight horizontal times 8H, the time length of the average non-emission period of each frame period FP1, FP2, FP3 and FP4 may be adjusted by the interval of two horizontal times 2H. This is because in the second (low power) mode, the off period ratio is determined over four frame periods.

Although FIG. 11 illustrates an example where the off period ratio is determined in units of one frame period in the first mode and is determined in units of four frame periods, determining the off period ratio is not limited to the example of FIG. 11. For example, the off period ratio may be determined in units of two (or a different number of) frame periods in one or both of the first mode and the second mode.

As described above, in the display device 300 according to embodiments, the cycle of each emission clock signal CLK1 and CLK2 in the second mode (e.g., the low power mode) may be increased compared with the cycle of each emission clock signal CLK1 and CLK2 in the first mode (e.g., the normal mode). Accordingly, the power consumption of the emission driver 370 and the display device 300 may be reduced in the second mode. Further, in the display device 300 according to embodiments, the off period ratio may be determined by the units of two or more frame periods in the second mode. Accordingly, in the second mode, although the cycle of each emission clock signal CLK1 and CLK2 is increased, the time length of the average non-emission period may be finely or minutely adjusted, and the off period ratio may be finely or minutely adjusted.

Figure 12:
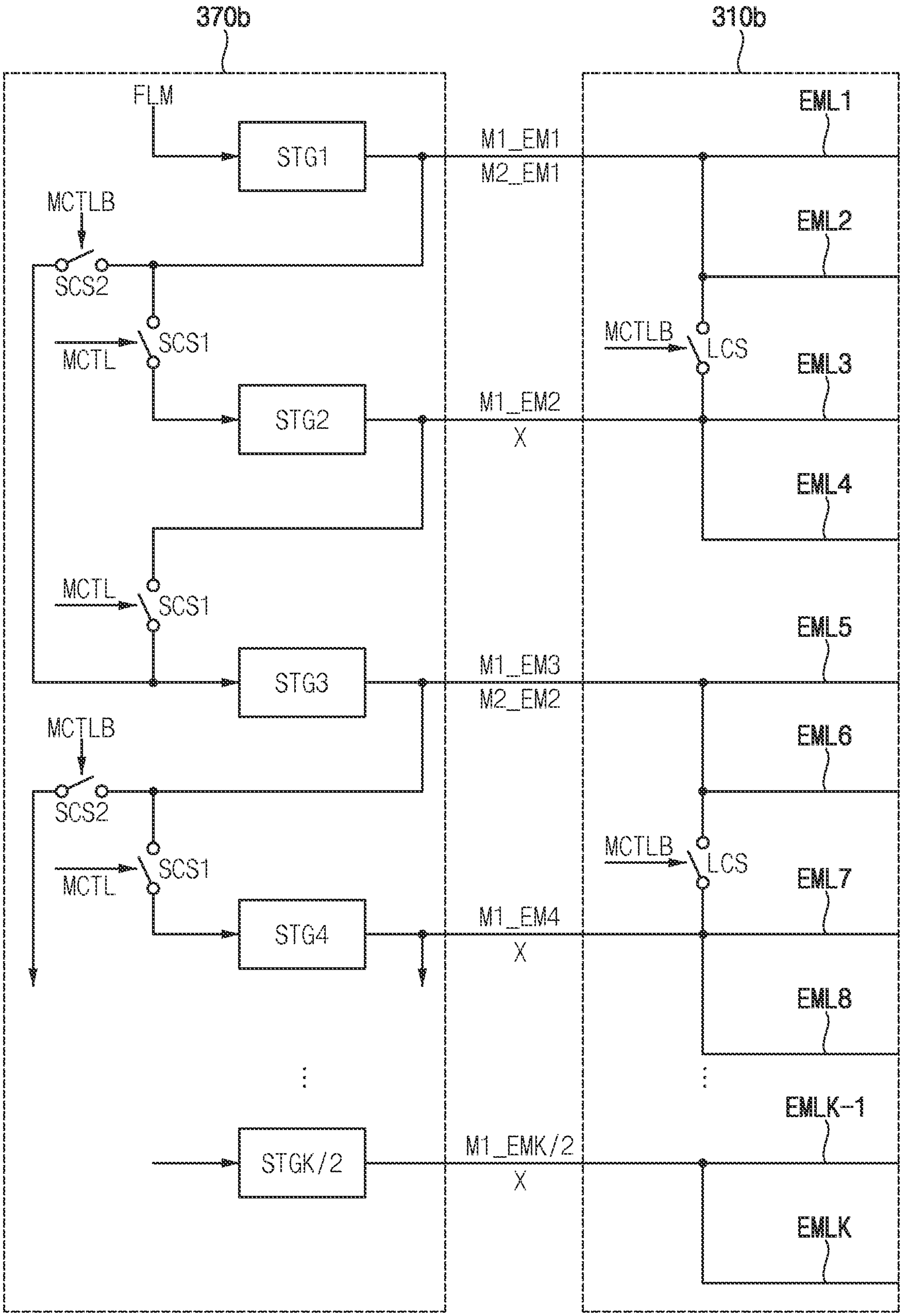
FIG. 12 is a block diagram illustrating an emission driver according to embodiments.
Figure 13:
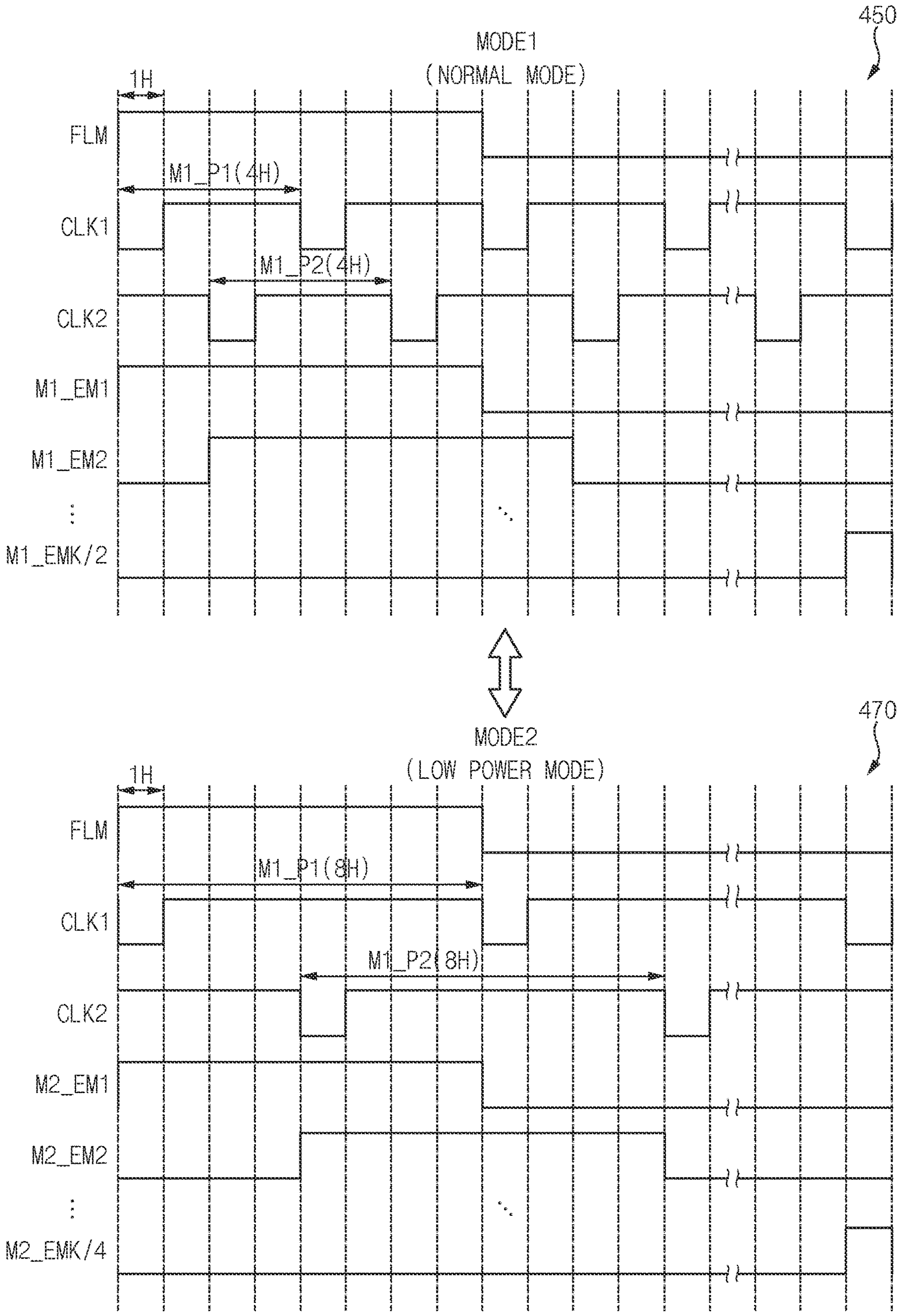
FIG. 13 is a timing diagram for describing an example of operations of an emission driver in a first mode and a second mode according to embodiments.
Figure 14:
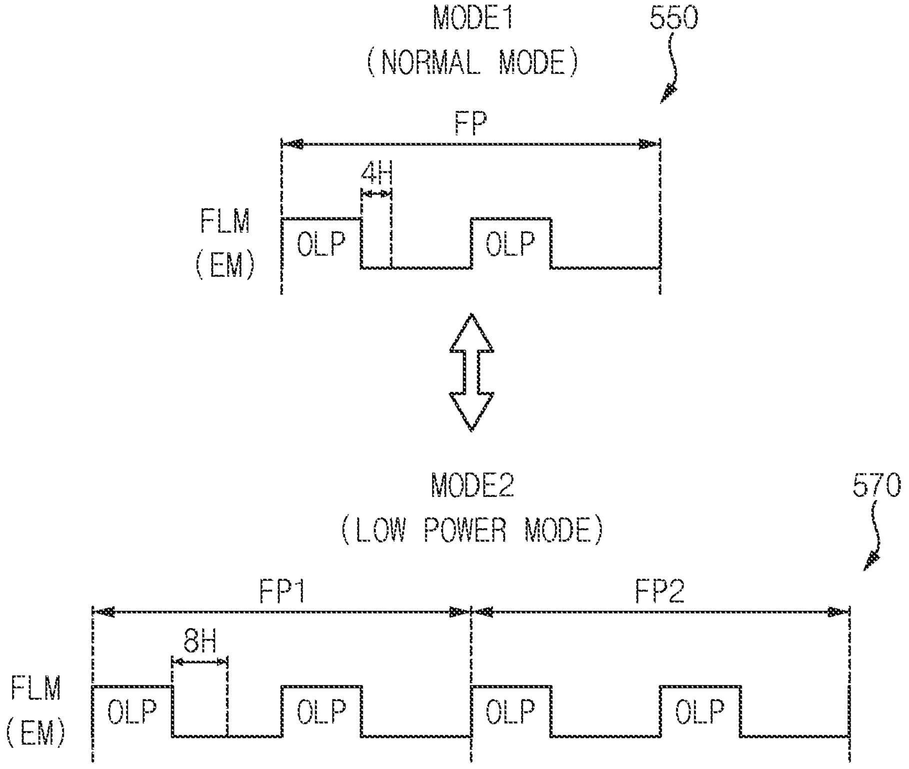
FIG. 14 is a diagram illustrating an example of an emission start signal in a first mode and a second mode according to embodiments.

FIG. 12 is a block diagram illustrating an emission driver 370*b* according to embodiments, FIG. 13 is a timing diagram for describing an example of operations of the emission driver in a first mode and a second mode according to embodiments, and FIG. 14 is a diagram illustrating an example of an emission start signal in a first mode and a second mode according to embodiments.

The emission driver 370*b* illustrated in FIG. 12 may sequentially provide emission signals in units of two pixel rows of a display panel 310*b* in a first mode, and may sequentially provide emission signals in units of four pixel rows of the display panel 310*b* in a second mode. For example, the emission driver 370*b* may apply the same emission signal to two emission lines of the display panel 310*b* in the first mode, and may apply the same emission signal to four emission lines of the display panel 310*b* in the second mode.

Referring to FIG. 12, the display panel 310*b* may include K emission lines EML1, EML2, EML3, EML4, EML5, EML6, EML7, EML8, . . . , EMLK, and the emission driver 370*b* may include K/2 stages STG1, STG2, STG3, STG4, . . . , STGK/2, where K is an integer greater than or equal to 4.

The display panel 310*b* may further include line connection switches LCS that connect the K emission lines EML1 through EMLK to each other in units of two emission lines in the first mode, and connect the K emission lines EML1 through EMLK to each other in units of four emission lines in the second mode. For example, among four emission lines (e.g., first through fourth emission lines EML1, EML2, EML3 and EML4), two emission lines (e.g., first and second emission lines EML1 and EML2) are connected to each other, the other two emission lines (e.g., third and fourth emission lines EML3 and EML4) are connected to each other, and one line connection switch LCS may be disposed therebetween. The line connection switches LCS may be turned off (or opened) in response to an inverted mode control signal MCTLB having an off-level in the first mode, and may be turned on (or closed) in response to the inverted mode control signal MCTLB having an on-level in the second mode. If the line connection switches LCS are closed, the four emission lines (e.g., the first through fourth emission lines EML1, EML2, EML3 and EML4) may be connected to each other.

The emission driver 370*b* may include stage connection switches SCS1 and SCS2 that cascade-connect the K/2 stages STG1 through STGK/2 in the first mode, and cascade-connect K/4 stages STG1, STG3, . . . of the K/2 stages STG1 through STGK/2 in the second mode. For example, the emission driver 370*b* may include first stage connection switches SCS1 located between input terminals and output terminals of the K/2 stages STG1 through STGK/2, and second stage connection switches SCS2 located between input terminals and output terminals of the K/4 stages STG1, STG3, . . . . The first stage connection switches SCS1 may be turned on (or closed) in response to the mode control signal MCTL having the on-level in the first mode, and may connect an output terminal of a previous stage (e.g., a first stage STG1) to an input terminal of a current stage (e.g., a second stage STG2). Further, the second stage connection switches SCS2 may be turned on (or closed) in response to the inverted mode control signal MCTLB having the on-level in the second mode, and may connect an output terminal of a (2P−1)-th stage (e.g., the first stage STG1) to an input terminal of a (2P+1)-th stage (e.g., a third stage STG3), where P is an integer greater than or equal to 1 and less than K/2.

Accordingly, in the first mode, a first stage STG1 may apply a first emission signal M1_EM1 to first and second emission lines EML1 and EML2, a second stage STG2 may apply a second emission signal M1_EM2 to third and fourth emission lines EML3 and EML4, a third stage STG3 may apply a third emission signal M1_EM3 to fifth and sixth emission lines EML5 and EML6, a fourth stage STG4 may apply a fourth emission signal M1_EM4 to seventh and eighth emission lines EML7 and EML8, and a (K/2)-th stage STGK/2 may apply a (K/2)-th emission signal M1_EMK/2 to (K−1)-th and K-th emission lines EMLK-1 and EMLK.

Further, in the second mode, the first stage STG1 may apply a first emission signal M2_EM1 to the first through fourth emission lines EML1, EML2, EML3 and EML4, and the second stage STG2 may output no emission signal. Further, the third stage STG3 may apply a second emission signal M2_EM2 to the fifth through eighth emission lines EML5, EML6, EML7 and EML8, and the fourth stage STG4 may output no emission signal.

Further, the emission driver 370*b* may operate in response to an emission clock signal having a cycle corresponding to a first number (e.g., four) horizontal times in the first mode, and may operate in response to the emission clock signal having a cycle corresponding to a second number (e.g., eight) horizontal times in the second mode, where the second number is greater than the first number.

For example, as illustrated in a first timing diagram 450 of FIG. 13, in the first mode (or the normal mode), a cycle (or a period) M1_P1 and M1_P2 of each of first and second emission clock signals CLK1 and CLK2 may correspond to four horizontal times 4H. In the first mode, the first stage STG1 may output an emission start signal FLM as the first emission signal M1_EM1 in response to the first emission clock signal CLK1, the second stage STG2 may output the second emission signal M1_EM2 by shifting the first emission signal M1_EM1 by two horizontal times in response to the second emission clock signal CLK2, and the third stage STG3 may output the third emission signal M1_EM3 by shifting the second emission signal M1_EM2 by two horizontal times in response to the first emission clock signal CLK1. In this manner, in the first mode, the first through (K/2)-th stages STG1 through STGK/2 may sequentially output the first through (K/2)-th emission signals M1_EM1 through M1_EMK/2 by shifting their input signals by two horizontal times.

Further, as illustrated in a second timing diagram 470 of FIG. 13, in the second mode (or the low power mode), the cycle (or the period) M2_P1 and M2_P2 of each of the first and second emission clock signals CLK1 and CLK2 may correspond to eight horizontal times 8H. In the second mode, the first stage STG1 may output the emission start signal FLM as the first emission signal M2_EM1 in response to the first emission clock signal CLK1, and the third stage STG3 may output the second emission signal M2_EM2 by shifting the first emission signal M2_EM1 by four horizontal times in response to the second emission clock signal CLK2. In addition, a fifth stage may output the third emission signal M2_EM3 by shifting the second emission signal M2_EM2 by four horizontal times in response to the first emission clock signal CLK1. In this manner, in the second mode, the K/4 stages STG1, STG3, . . . may sequentially output K/4 emission signals M2_EM1, M2_EM2, . . . , M2_EMK/4 by shifting their input signals by four horizontal times.

In addition, in some embodiments, a controller may determine an off period ratio in units of one frame period in response to a dimming signal SDIM in the first mode, and may determine the off period ratio in units of two frame periods in response to the dimming signal SDIM in the second mode.

For example, as illustrated in a first timing diagram 550 of FIG. 14, in the first mode (or the normal mode), the controller may determine the off period ratio in units of one frame period FP, and may control widths of off-level pulses OLP of the emission start signal FLM within one frame period FP based on the off period ratio. In this case, since each emission clock signal CLK1 and CLK2 has the cycle corresponding to four horizontal times 4H in the first mode, the width of each off-level pulse OLP may be adjusted by an interval of four horizontal times 4H, and a time length of a non-emission period of each frame period FP also may be adjusted by the interval of four horizontal times 4H.

Further, as illustrated in a second timing diagram 570 of FIG. 14, in the second mode (or the low power mode), the controller may determine the off period ratio in units of two frame periods FP1 and FP2, and may control widths of off-level pulses OLP of the emission start signal FLM in the two frame periods FP1 and FP2 based on the off period ratio. In this case, since each emission clock signal CLK1 and CLK2 has the cycle corresponding to eighth horizontal times 8H in the second mode, the width of each off-level pulse OLP may be adjusted by an interval of eight horizontal times 8H. However, if the width of one off-level pulse OLP is adjusted by eighth horizontal times 8H in the two frame periods FP1 and FP2, a time length of an average non-emission period of an average frame period may be adjusted by four horizontal times 4H. Thus, although the width of each off-level pulse OLP is adjusted by eight horizontal times 8H, the time length of the average non-emission period of each frame period FP1 and FP2 may be adjusted by the interval of four horizontal times 4H.

Although FIG. 14 illustrates an example where the off period ratio is determined in units of one frame period in the first mode, and is determined in units of two frame periods, determining the off period ratio is not limited to the example of FIG. 14. For example, in other embodiments, the off period ratio may be determined in units of more than one frame period in the first mode.

As described above, in the display device according to embodiments, the cycle of each emission clock signal CLK1 and CLK2 in the second mode (e.g., the low power mode) may be increased compared with the cycle of each emission clock signal CLK1 and CLK2 in the first mode (e.g., the normal mode). Accordingly, the power consumption of the emission driver 370*b* and the display device may be reduced in the second mode. Further, in the display device according to embodiments, the off period ratio may be determined by the units of two or more frame periods in the second mode. Accordingly, in the second mode, although the cycle of each emission clock signal CLK1 and CLK2 is increased, the time length of the average non-emission period may be finely or minutely adjusted, and the off period ratio may be finely or minutely adjusted.

Figure 15:
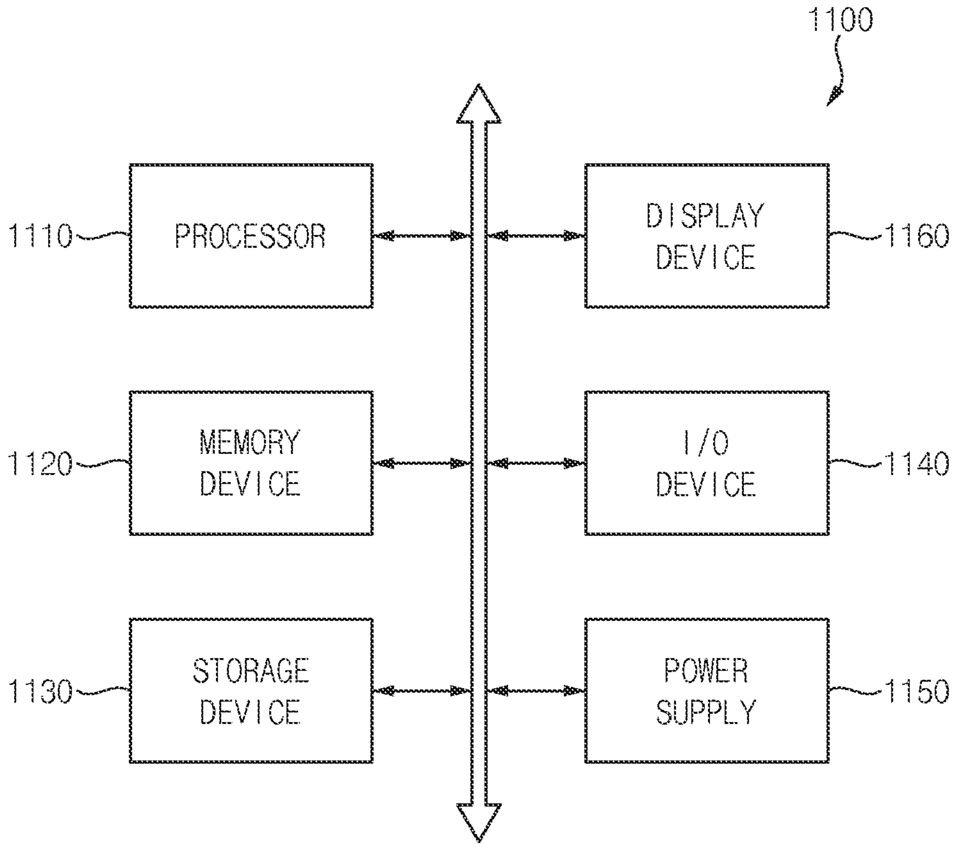
FIG. 15 is a block diagram illustrating an electronic device including a display device according to embodiments.

FIG. 15 is a block diagram illustrating an electronic device 1100 including a display device according to embodiments. Referring to FIG. 15, the electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a cycle (or a period) of each emission clock signal may be increased (e.g., corresponding to eight horizontal times) and an off period ratio for pixels may be determined in units of two or more frame periods. Accordingly, power consumption of an emission driver and the display device 1160 may be reduced, and the off period ratio may be finely or minutely adjusted.

The inventive concepts may be applied to any display device 1160, and any electronic device 1100 including the display device 1160. For example, the inventive concepts may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor to perform the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, units, drivers, and other signal generating and signal processing features of the embodiments disclosed herein may be implemented, for example, in non-transitory logic that may include hardware, software, or both. When implemented at least partially in hardware, the controllers, processors, devices, units, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, units, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. The embodiments may be combined to form additional embodiments.

The invention claimed is:

1. A display device comprising:

a display panel including pixels connected to emission lines;

a controller configured to receive a dimming signal and to generate an emission start signal, a first emission clock signal and a second emission clock signal; and an emission driver configured to provide emission signals to the pixels through the emission lines in response to the emission start signal, the first emission clock signal and the second emission clock signal, wherein the controller is further configured to determine an off period ratio for the pixels in units of two or more frame periods in response to the dimming signal, and wherein the off period ratio corresponds to a ratio of a sum of widths of a plurality of off-level pulses of the emission start signal to a time length of the two or more consecutive frame periods.

2. The display device of claim 1, wherein the controller is configured to control widths of the plurality of off-level pulses of the emission start signal in the two or more frame periods, such that the pixels do not emit light during one or more non-emission periods corresponding to the off period ratio in the two or more frame periods.

3. The display device of claim 1, wherein the controller is configured to:

generate the emission start signal having N off-level pulses in each frame period and determine the off period ratio in units of M frame periods in response to the dimming signal, where N is an integer greater than O, and M is an integer greater than 1, and control widths of M*N off-level pulses of the emission start signal based on the off period ratio, such that a ratio of a sum of the widths of the M*N off-level pulses of the emission start signal to a time length of the M frame periods is equal to the off period ratio.

4. The display device of claim 1, wherein the controller is configured to:

generate the emission start signal having two off-level pulses in each frame period and determine the off period ratio in units of two frame periods in response to the dimming signal, and control widths of four off-level pulses of the emission start signal based on the off period ratio, such that a ratio of a sum of the widths of the four off-level pulses of the emission start signal to a time length of the two frame periods is equal to the off period ratio.

5. The display device of claim 1, wherein a cycle of each of the first emission clock signal and the second emission clock signal corresponds to eight horizontal times.

6. The display device of claim 1, wherein:

the first emission clock signal includes an on-level pulse having a width corresponding to one horizontal time after three horizontal times from a time point at which the second emission clock signal is changed from an on-level to an off-level, and the second emission clock signal includes an on-level pulse having a width corresponding to one horizontal time after three horizontal times from a time point at which the first emission clock signal is changed from the on-level to the off-level.

7. The display device of claim 1, wherein the emission driver is configured to apply a same one of the emission signals to two or more emission lines of the emission lines.

8. The display device of claim 1, wherein:

a number of the emission lines is K, and the display panel includes K rows of the pixels respectively connected to the K emission lines, where K is an integer greater than or equal to 4, the emission driver includes K/4 stages that are configured to sequentially output the emission signals, and each of the K/4 stages is configured to output a same one of the emission signals to four rows of the pixels through four emission lines of the K emission lines.

9. The display device of claim 1, wherein:

the controller is configured to receive a mode signal representing a first mode or a second mode, and the emission driver is configured to sequentially apply different ones of the emission signals to the emission lines in the first mode, and to apply a same one of the emission signals to four emission lines of the emission lines in the second mode.

10. The display device of claim 9, wherein the controller is configured to increase a cycle of each of the first and second emission clock signals in the second mode, such that the cycle of each of the first and second emission clock signals in the second mode corresponds to four times a cycle of each of the first and second emission clock signals in the first mode.

11. The display device of claim 9, wherein:

a cycle of each of the first emission clock signal and the second emission clock signal in the first mode corresponds to two horizontal times, and a cycle of each of the first emission clock signal and the second emission clock signal in the second mode corresponds to eighth horizontal times.

12. The display device of claim 1, wherein:

the controller is configured to receive a mode signal representing a first mode or a second mode, and the emission driver is configured to apply a same one of the emission signals to two emission lines of the emission lines in the first mode, and to apply a same one of the emission signals to four emission lines of the emission lines in the second mode.

13. A display device comprising:

a display panel including pixels connected to emission lines;

a controller configured to receive a dimming signal and a mode signal representing a first mode or a second mode, and to generate an emission start signal, a first emission clock signal and a second emission clock signal; and an emission driver configured to provide emission signals to the pixels through the emission lines in response to the emission start signal, the first emission clock signal and the second emission clock signal, wherein the controller is further configured to determine an off period ratio for the pixels in units of two or more frame periods in response to the dimming signal, and wherein the emission driver is configured to apply a same one of the emission signals to a first number of the emission lines in the first mode, and to apply a same one of the emission signals to a second number of the emission lines in the second mode.

14. A method for controlling a display device, comprising:

receiving a control signal;

generating an emission start signal; and controlling pixels based on the emission start signal, wherein the emission start signal includes a plurality of on-level signals and off-level pulses included within a plurality of frame periods, each of the off-level pulses having a duration that includes a plurality of horizontal times, and wherein generating the emission start signal includes increasing a width of at least one of the off-level pulses based on the control signal, the width of the at least one off-level pulse increased by a first number of the horizontal times to produce an average frame period that is increased by a second number of the horizontal times less than the first number of horizontal times.

15. The method of claim 14, wherein an off period ratio for the pixels is equal to a sum of the widths of the off-level pulses included within the plurality of frame periods divided by a time length of the plurality of frame periods.

16. The method of claim 14, wherein each of the horizontal times corresponds to a duration of an emission clock pulse that controls generation of the emission start signal.

17. The method of claim 14, wherein:

the first number of times is eight, and the second number of times is four.

18. The method of claim 14, wherein the plurality of frames is two or more.

19. The method of claim 14, wherein the control signal is a dimming signal.

20. The method of claim 14, wherein the control signal is a low power mode signal.

* * * * *